United States Patent
Richards et al.

(10) Patent No.: US 10,931,934 B2
(45) Date of Patent: Feb. 23, 2021

(54) WATERCRAFT THERMAL MONITORING SYSTEMS AND METHODS

(71) Applicant: FLIR Belgium BVBA, Meer (BE)

(72) Inventors: Austin A. Richards, Santa Barbara, CA (US); Peter A. Reid, Solvang, CA (US); Jay E. Robinson, Ventura, CA (US); Andrew C. Teich, West Linn, OR (US); Christopher Daniel Gatland, Fareham (GB); Gordon Pope, Fareham (GB)

(73) Assignee: FLIR Belgium BVBA, Meer (BE)

(*) Notice: Subject to any disclaimer, the term of this patent is extended or adjusted under 35 U.S.C. 154(b) by 0 days.

(21) Appl. No.: 14/985,392

(22) Filed: Dec. 30, 2015

(65) Prior Publication Data

US 2016/0214534 A1    Jul. 28, 2016

Related U.S. Application Data

(63) Continuation-in-part of application No. PCT/US2015/045962, filed on Aug. 19, 2015.

(Continued)

(51) Int. Cl.
*H04N 13/25*    (2018.01)
*H04N 5/33*    (2006.01)
(Continued)

(52) U.S. Cl.
CPC .......... *H04N 13/25* (2018.05); *G01S 13/867* (2013.01); *G01S 13/937* (2020.01);
(Continued)

(58) Field of Classification Search
None
See application file for complete search history.

(56) References Cited

U.S. PATENT DOCUMENTS

| | | | | |
|---|---|---|---|---|
| 5,633,710 A | * | 5/1997 | Kumra | B60Q 1/10 315/82 |
| 6,014,608 A | * | 1/2000 | Seo | G01C 21/3602 701/301 |

(Continued)

FOREIGN PATENT DOCUMENTS

| | | | | |
|---|---|---|---|---|
| DE | 102006010295 A1 | * | 9/2007 | ............. H04N 5/247 |
| DE | 102014206677 A1 | * | 10/2015 | ............. G06T 7/593 |

(Continued)

OTHER PUBLICATIONS

Kriesel; True-Color Night Vision Fusion System Using a VNIR EMCCD and a LWIR Microvolometer Camera; Apr. 2010; SPIE Defense and Security Meeting; https://optoknowledge.com/documents/publications/OKSI-2010-04.pdf (Year: 2010).*

(Continued)

*Primary Examiner* — David P. Merlino
(74) *Attorney, Agent, or Firm* — Haynes and Boone, LLP

(57) ABSTRACT

A watercraft may include a safety system having an imaging component and a control component. The control component may modify the operation of the watercraft based on images from the imaging component. The imaging component may include a thermal imaging component and a non-thermal imaging component. The watercraft may include more than one imaging component disposed around the periphery of the watercraft to monitor a volume surrounding the watercraft for objects in the water such as debris, a person, and/or dock structures. Operating the watercraft based on the images may include operating propulsion and/or steering systems of the watercraft based on a detected object. The control component may operate the propulsion and/or steering systems to disable a propeller when a swimmer is detected, to avoid detected debris, and/or to perform or assist in performing docking maneuvers. The (Continued)

imaging components may include compact thermal imaging modules mounted on or within the hull of the watercraft.

21 Claims, 18 Drawing Sheets

Related U.S. Application Data

(60) Provisional application No. 62/098,263, filed on Dec. 30, 2014, provisional application No. 62/044,906, filed on Sep. 2, 2014.

(51) Int. Cl.
| | | |
|---|---|---|
| *H04N 5/225* | (2006.01) | |
| *H04N 13/204* | (2018.01) | |
| *H04N 13/246* | (2018.01) | |
| *G01S 13/86* | (2006.01) | |
| *H04N 13/257* | (2018.01) | |
| *G01S 13/937* | (2020.01) | |
| *B63B 43/18* | (2006.01) | |

(52) U.S. Cl.
CPC ......... *H04N 5/2257* (2013.01); *H04N 5/332* (2013.01); *H04N 13/204* (2018.05); *H04N 13/246* (2018.05); *H04N 13/257* (2018.05); *B60R 2300/107* (2013.01); *B60R 2300/108* (2013.01); *B60R 2300/80* (2013.01); *B63B 43/18* (2013.01)

(56) References Cited

U.S. PATENT DOCUMENTS

| | | | | |
|---|---|---|---|---|
| 7,098,458 B2* | 8/2006 | Kuerbitz | ................ | H04N 5/33 250/330 |
| 8,581,982 B1* | 11/2013 | Haley | ................ | H04N 7/18 348/148 |
| 9,488,488 B2 | 11/2016 | Waldman | | |
| 2004/0032493 A1* | 2/2004 | Franke | ................ | B60R 1/00 348/148 |
| 2005/0012603 A1* | 1/2005 | Ewerhart | ................ | B62D 15/029 340/435 |
| 2006/0098093 A1* | 5/2006 | Hahn | ................ | H04N 13/376 348/148 |
| 2006/0274147 A1* | 12/2006 | Chinomi | ................ | B60R 1/00 348/118 |
| 2009/0128399 A1* | 5/2009 | Root, Jr. | ................ | F41G 3/04 348/166 |
| 2009/0237268 A1* | 9/2009 | Tomoyuki | ................ | B60Q 11/005 340/901 |
| 2009/0271054 A1* | 10/2009 | Dokken | ................ | G01S 13/9307 701/21 |
| 2010/0063673 A1* | 3/2010 | Anderson | ................ | G05D 1/0287 701/29.2 |
| 2010/0070139 A1* | 3/2010 | Ohshima | ................ | B60R 1/00 701/42 |
| 2010/0231716 A1* | 9/2010 | Klaerner | ................ | B60R 1/00 348/148 |
| 2010/0309315 A1* | 12/2010 | Hogasten | ................ | H04N 5/33 348/164 |
| 2011/0102196 A1* | 5/2011 | Kadowaki | ................ | B62D 15/0275 340/932.2 |
| 2011/0141242 A1* | 6/2011 | Fernandez Alvarez | ................ | G08G 1/0962 348/47 |
| 2012/0038748 A1* | 2/2012 | Lindgren | ................ | B60R 1/00 348/47 |
| 2012/0224063 A1* | 9/2012 | Terre | ................ | G08B 13/1963 348/148 |
| 2013/0038734 A1* | 2/2013 | Furukawa | ................ | H04N 5/232945 348/148 |
| 2013/0192451 A1* | 8/2013 | Scott | ................ | F41G 3/147 89/41.05 |
| 2014/0022864 A1 | 1/2014 | Lebedev | | |
| 2014/0285620 A1* | 9/2014 | Choi | ................ | G06T 5/008 348/43 |
| 2014/0368646 A1* | 12/2014 | Traff | ................ | H04N 5/33 348/143 |
| 2015/0103174 A1* | 4/2015 | Emura | ................ | G06K 9/00805 348/148 |
| 2015/0172545 A1* | 6/2015 | Szabo | ................ | H04N 5/23238 348/36 |
| 2015/0288948 A1* | 10/2015 | Schamp | ................ | B60R 1/00 348/47 |
| 2016/0023761 A1* | 1/2016 | McNally | ................ | B64C 39/024 29/407.01 |
| 2016/0050345 A1* | 2/2016 | Longbotham | ................ | H04N 13/0239 348/47 |
| 2016/0266246 A1* | 9/2016 | Hjelmstad | ................ | G01S 17/023 |
| 2017/0160393 A1 | 6/2017 | Gatland | | |
| 2018/0244153 A1* | 8/2018 | Ejiri | ................ | G02B 27/01 |

FOREIGN PATENT DOCUMENTS

| | | | | |
|---|---|---|---|---|
| JP | 2004142658 A | * | 5/2004 | |
| WO | WO-2010103061 A1 | * | 9/2010 | ............ G06T 7/73 |
| WO | WO 2010/141011 | | 12/2010 | |
| WO | WO 2013/108088 | | 7/2013 | |

OTHER PUBLICATIONS

Esparza Garcia Jose Domingo; Machine Translation of DE-102014206677-A1, Oct. 2015 (Year: 2015).*

* cited by examiner

WATERCRAFT THERMAL MONITORING SYSTEMS AND METHODS

CROSS-REFERENCE TO RELATED APPLICATIONS

This application claims priority to and the benefit of U.S. Provisional Patent Application No. 62/098,263 filed Dec. 30, 2014 and entitled "WATERCRAFT HAVING PERIMETER MONITORING SYSTEMS," which is hereby incorporated herein by reference in its entirety.

This application is also a continuation-in-part of International Patent Application No. PCT/US2015/45962 filed Aug. 19, 2015 and entitled "AUGMENTED REALITY SONAR IMAGERY SYSTEMS AND METHODS," which claims the benefit of U.S. Provisional Patent Application No. 62/044,906 filed Sep. 2, 2014 and entitled "AUGMENTED REALITY SONAR IMAGERY SYSTEMS AND METHODS," all of which are incorporated herein by reference in their entirety.

TECHNICAL FIELD

One or more embodiments of the present disclosure relate generally to watercraft and more particularly, for example, to systems and methods for providing monitoring for watercraft.

BACKGROUND

Objects around the periphery of a watercraft, such as a boat or ship, can be hazardous to the watercraft and/or to the objects. In some situations, it can be difficult for an operator of the watercraft to avoid damaging the watercraft or the objects, particularly when the operator is unaware of the existence and/or the location of the objects relative to the watercraft while the watercraft is moving. For example, in recreational boating, people, including children, are often injured by an operating propeller while swimming behind a boat. Thus, there is a need in the art for improved safety and/or monitoring for watercraft, particularly while the watercraft is in motion.

SUMMARY

Systems and methods disclosed herein, in accordance with one or more embodiments, provide processing techniques and modes of operation for watercraft having perimeter monitoring systems. A watercraft perimeter monitoring system may include one or more imaging modules and/or one or more sensor modules. Imaging modules and/or other sensor modules may be disposed around the periphery of the watercraft so that each module monitors a portion of the perimeter around the watercraft. For example, in one embodiment, infrared camera modules are disposed around the periphery of a watercraft, each positioned to monitor a designated portion of a volume encircling the watercraft to detect an object or objects within the volume. In one embodiment, the system may process infrared images to detect a swimmer and may alert an operator as well as promptly shut off a propeller of the watercraft based on the detection. Non-thermal imaging modules, such as visible light imaging modules and/or other sensors and/or sensor systems such as radar systems (e.g., frequency-modulated continuous-wave (FMCW) radar systems that provide relatively close range detection of objects in the surrounding environment), sonar systems (e.g., side scanning, three-dimensional (3D) and/or forward looking sonar systems capable of providing alerts and/or showing above and/or below water sonar images), microwave detector systems, laser detector systems (e.g., laser scanning arrays for generating three-dimensional images and/or models of detected objects), gas sensors such as air quality sensors, or other sensors, may also be positioned around the perimeter of the watercraft to monitor one or more portions of the volume separately from or in cooperation with the infrared camera modules.

In accordance with an embodiment of the present disclosure, a watercraft is provided having a monitoring system; the monitoring system of the watercraft includes: a plurality of compact infrared imaging modules disposed on or within the hull of the watercraft to detect an object around at least a substantial portion of a volume around the watercraft; a memory component adapted to store detection data; a processing component to process the detection data; an alert component to alert an operator to detected objects; and a control component to modify operation of the watercraft based on image data and/or other sensor data, such as infrared images from the compact infrared imaging modules.

The scope of the disclosure is defined by the claims, which are incorporated into this section by reference. A more complete understanding of embodiments of the present disclosure will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

According to a first aspect of the invention shown in FIGS. 1A-1E, there is provided a safety system such as monitoring system 100A (sometimes referred to herein as a detection system) for a watercraft. For example, a perimeter monitoring system such as monitoring system 100A may be implemented on or within a ship or a recreational boat. Perimeter monitoring system 100A may operate to detect objects in the water surrounding the watercraft and to modify the operation of the watercraft relative to the detected objects. For example, a watercraft such as a recreational boat with a propeller may include an implementation of system 100A that disables or deactivates the propeller when a swimmer is detected behind the boat. Images, such as thermal images, of the area behind or around the boat may be used to detect the swimmer in daylight or even in darkness or poor viewing conditions whether or not the operator of the boat is aware of the presence or location of the swimmer. In various embodiments, monitoring system 100A may be implemented with one or more components, systems, subsystems, and/or other elements of and/or similar to systems 100 and/or 100B described in reference to at least FIGS. 1A and 1B of International Patent Application No. PCT/US2015/45962 filed Aug. 19, 2015 and entitled "AUGMENTED REALITY SONAR IMAGERY SYSTEMS AND METHODS," which is incorporated by reference herein.

Figure 1A:
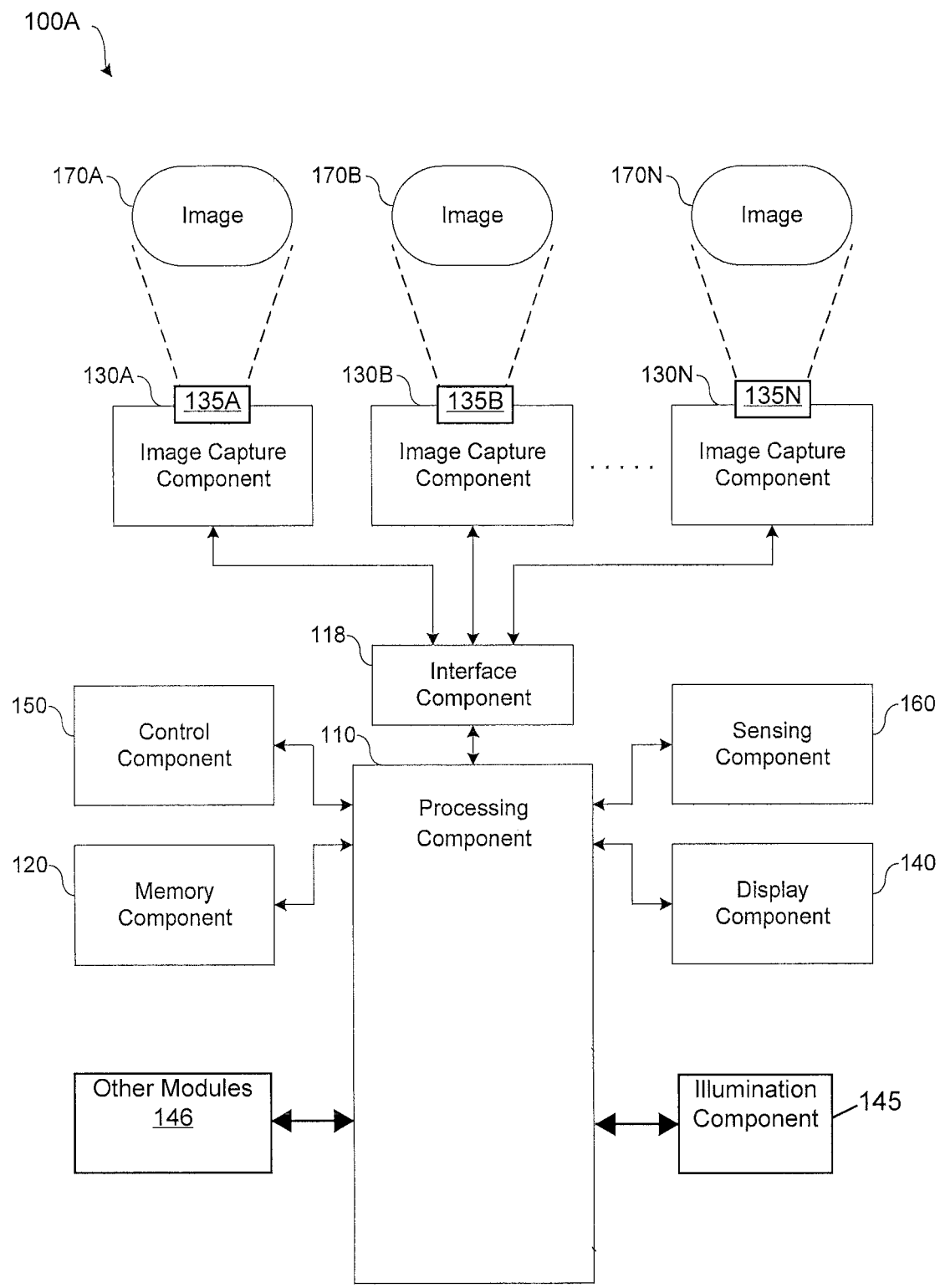
FIG. 1A shows a block diagram of a monitoring system in accordance with various embodiments of the present disclosure.

In accordance with one embodiment of the present disclosure, FIG. 1A shows a block diagram illustrating a perimeter monitoring system 100A that includes imaging components for capturing and processing images. As shown, monitoring system 100A may include a processing component 110, a memory component 120, one or more image capture components 130A-130N (where "N" represents any desired number), a display component 140, an illumination component 145, a control component 150, and a sensing component 160.

In various implementations, monitoring system 100A may include one or more imaging or image capture components 130A-130N (e.g., one or more thermal imaging modules and/or one or more non-thermal imaging modules) to capture images, such as images 170A-170N. Image capture components 130A-130N (sometimes referred to herein as imaging modules) may include infrared cameras sensitive to light in near, mid, and/or far infrared portions of the electromagnetic spectrum (e.g., near infrared (NIR), short wave infrared (SWIR), mid wave infrared (MWIR), and/or long wave infrared (LWIR) radiation). Image capture components 130A-130N and/or other sensing components, such as sensing component 160, may be located on or within the hull of a watercraft, such as watercraft/mobile structure 180 of FIGS. 1B-1F, FIG. 2 and/or FIG. 3. In various embodiments, image capture components 130A-130N and/or other portions of monitoring system 100A may be implemented with one or more components, systems, subsystems, and/or other elements of and/or similar to portable imaging device 220 and/or wearable portable imaging device 420 described in reference to at least FIGS. 2, 3, and 4 of International Patent Application No. PCT/US2015/45962 filed Aug. 19, 2015 and entitled "AUGMENTED REALITY SONAR IMAGERY SYSTEMS AND METHODS," which is incorporated by reference herein.

Processing component 110 includes, in one embodiment, one or more of a microprocessor, a single-core processor, a multi-core processor, a microcontroller, a logic device (e.g., a programmable logic device configured to perform processing functions), a digital signal processing (DSP) device, or other type of generally known processor. Processing component 110 may be adapted to interface and communicate with other components of system 100A and to perform method and processing steps as described herein.

Various operations as described herein for safety systems for a watercraft may be performed by processing modules implemented in software and/or hardware as part of processing component 110, or code (e.g., software and/or configuration data), which may be stored in memory component 120. Embodiments of optional processing modules disclosed herein may be stored in a separate computer-readable medium (e.g., a memory such as a hard drive, a compact disk, a digital video disk, or a flash memory) to be executed by a computer (e.g., a logic or processor-based system) to perform various methods disclosed herein. In one example, the computer-readable medium may be portable and/or located separate from system 100A, with stored processing modules provided to system 100A by coupling the computer-readable medium to system 100A and/or by system 100A downloading (e.g., via a wired or wireless link) the processing modules from the computer-readable medium (e.g., using one or more interfaces similar to and/or integrated with interface component 118).

Memory component 120 includes, in one embodiment, one or more memory devices to store data and information. The one or more memory devices may comprise various types of memory including volatile and non-volatile memory devices such as RAM (Random Access Memory), ROM (Read-Only Memory), EEPROM (Electrically-Erasable Read-Only Memory), flash memory, etc. Processing component 110 is adapted to execute software stored in memory component 120 to perform methods, processes, and modes of operations in manner as described herein.

In some embodiments, one or more of image capture components 130A-130N includes an imaging module (e.g., an infrared imaging module including a focal plane array) for capturing image signals representative of one or more images such as visible light and/or infrared images (e.g., images 170A-170N). In one implementation, the imaging modules and/or sensors (e.g., a plurality of visible light sensitive sensors and/or a plurality of infrared sensitive microbolometer sensors arranged in a focal plane array) of image capture components 130A-130N provide for representing (e.g., converting) captured image signals of images 170A-170N as digital data (e.g., via an analog-to-digital converter included as part of the image capture components, the imaging modules, or separate from the visible light or infrared sensors as part of system 100A). Processing component 110 may be adapted to receive image signals, such as thermal image signals and/or non-thermal image signals from image capture components 130A-130N, process the image signals (e.g., to provide processed image data), store the image signals or image data in memory component 120, and/or retrieve stored image signals from memory component 120. Processing component 110 may be adapted to process image signals stored in memory component 120 to provide image data (e.g., captured and/or processed infrared image data) to display component 140 for viewing by a user. Processing component 110 may be adapted to perform video analytics operations on captured images to detect objects, analyze potential detections and sort false detections (e.g., by confirming an image-based detection using another sensor such as a sonar sensor) and, due to known angles of vision and overlaps of various imaging modules (e.g., as determined during factory calibration operations or in-situ calibration operations and stored in memory component 120) can triangulate to provide an estimated range and bearing of the detected objects. Processing component 110 may be adapted to cooperate with control component 150 to operate propulsion and/or steering components of a watercraft relative to objects detected in images and/or sensor data. Processing component 110 may be adapted to cooperate with an alert component (not shown) to alert an operator to a detected object. Processing component 110 may be adapted to stitch the images and provide alerts with bearings to the object regardless of the wavelength of the cameras that capture the images.

Display component 140 comprises, in one embodiment, an image display device (e.g., a liquid crystal display (LCD) or anti-glare screen) or various other types of generally known video displays or monitors. Processing component 110 may be adapted to display image data and information on display component 140. Processing component 110 may also be adapted to retrieve image data and information from memory component 120 and display any retrieved image data and information on display component 140. Display component 140 may comprise display electronics, which may be utilized by processing component 110 to display image data and information (e.g., infrared images). Display component 140 may receive image data and information directly from image capture components 130A-130N via processing component 110, or the image data and information may be transferred from memory component 120 via processing component 110.

In various embodiments, display component 140 and/or other portions of monitoring system 100A may be implemented with one or more components, systems, subsystems, and/or other elements of and/or similar to user interface 120, portable imaging device 220, and/or wearable portable imaging device 420 described in reference to at least FIGS. 1, 2, 3, and 4 of International Patent Application No. PCT/US2015/45962 filed Aug. 19, 2015 and entitled "AUGMENTED REALITY SONAR IMAGERY SYSTEMS AND METHODS," which is incorporated by reference herein. For example, in some embodiments, display component 140 may be adapted to display stereoscopic image data received from image capture components 130A-N and/or processed by processing component 110, for example, and be implemented as near-eye (e.g., wearable) stereo glasses or goggles and/or one or more autostereoscopic displays adapted to present stereoscopic (e.g., three dimensional) imagery to a user. In various embodiments, display component 140 may be implemented as an autostereoscopic multifunction display (A-MFD), such as an MFD including display component 140 integrated with one or more additional elements of system 100A, such as processing component 110, memory component 120, interface component 118, and/or other components and/or portions of components of system 100A. In one embodiment, an autostereoscopic display of display component 140 may be implemented with a parallax barrier film and/or similar technology.

Control component 150 may be adapted to respond to detected object information received from processing component 110 to generate control signals in response to one or more detected objects around the periphery of the watercraft/mobile structure. Propulsion and/or steering systems may be arranged to receive the control signals from control component 150 and respond to the control signals received therefrom. For example, control component 150 may provide signals that cause a propeller, jet or other propulsion mechanism to increase or decrease in power (e.g., to speed up or slow down the watercraft to avoid a detected object) or that disable power to the propulsion mechanism. Control component 150 may also, or alternatively, provide signals that cause a rudder or other steering mechanism to change position (e.g., to change the direction of travel of the watercraft to avoid a detected object or to position the watercraft relative to a detected dock or docking structures).

Sensing component 160 may include, in one embodiment, one or more various types of sensors, including environmental sensors, radar detection systems, sonar detection systems, virtual tripwire devices such as microwave transmitter/receiver pairs, laser transmitter/receiver pairs or other sensors, depending upon the desired application or implementation requirements, which provide information to processing component 110. Processing component 110 may be adapted to communicate with sensing component 160 (e.g., by receiving sensor information from sensing component 160) and with image capture component(s) 130 (e.g., by receiving data from image capture component(s) 130) and provide and/or receive command, control or other information to and/or from other components of system 100A.

Illumination component 145 may include one or more visible, infrared (IR) and/or ultraviolet (UV) transmitters for illuminating a portion of the periphery of the watercraft to be monitored (e.g., imaged). Illumination component 145 may generate light having a wavelength that is detectable with at least one of image capture components 130A-130N. In some embodiments, illumination component 145 may be articulated and be controlled by processing component 110 to illuminate a particular portion of an area around system 100A that is being imaged by one or more of image capture components 130.

In some embodiments, sensing component 160 (e.g., one or more of sensors 106) may include devices that relay information to processing component 110 via wireless communication. For example, sensing component 160 may be adapted to receive information from a satellite, through a local broadcast (e.g., radio frequency) transmission, through a mobile or cellular network and/or through information beacons in an infrastructure (e.g., a transportation or highway information beacon infrastructure) or various other wired or wireless techniques.

Other modules 146 may include other and/or additional sensors, actuators, communications modules/nodes, and/or user interface devices used to provide additional environmental information to system 100A, for example. In some embodiments, other modules 146 may include a humidity sensor, a wind and/or water temperature sensor, a barometer, a radar system, a visible spectrum camera, an infrared camera, and/or other environmental sensors providing measurements and/or other sensor signals that can be displayed to a user and/or used by other devices of system 100A (e.g., processing component 110) to provide operational control of a mobile structure (e.g., a watercraft) and/or system 100A that compensates for environmental conditions, such as wind speed and/or direction, swell speed, amplitude, and/or direction, and/or an object in a path of the mobile structure, for example. In some embodiments, other modules 146 may include one or more actuated devices (e.g., spotlights, infrared illuminators, cameras, radars, sonars, and/or other actuated devices) that may be coupled to a mobile structure and/or integrated with one or more components of system 100A, such as image capture components 130, where each actuated device includes one or more actuators adapted to adjust an orientation of the device, relative to a coupled mobile structure, in response to one or more control signals (e.g., provided by processing component 110 and/or control component 150, for example).

Figure 1B:
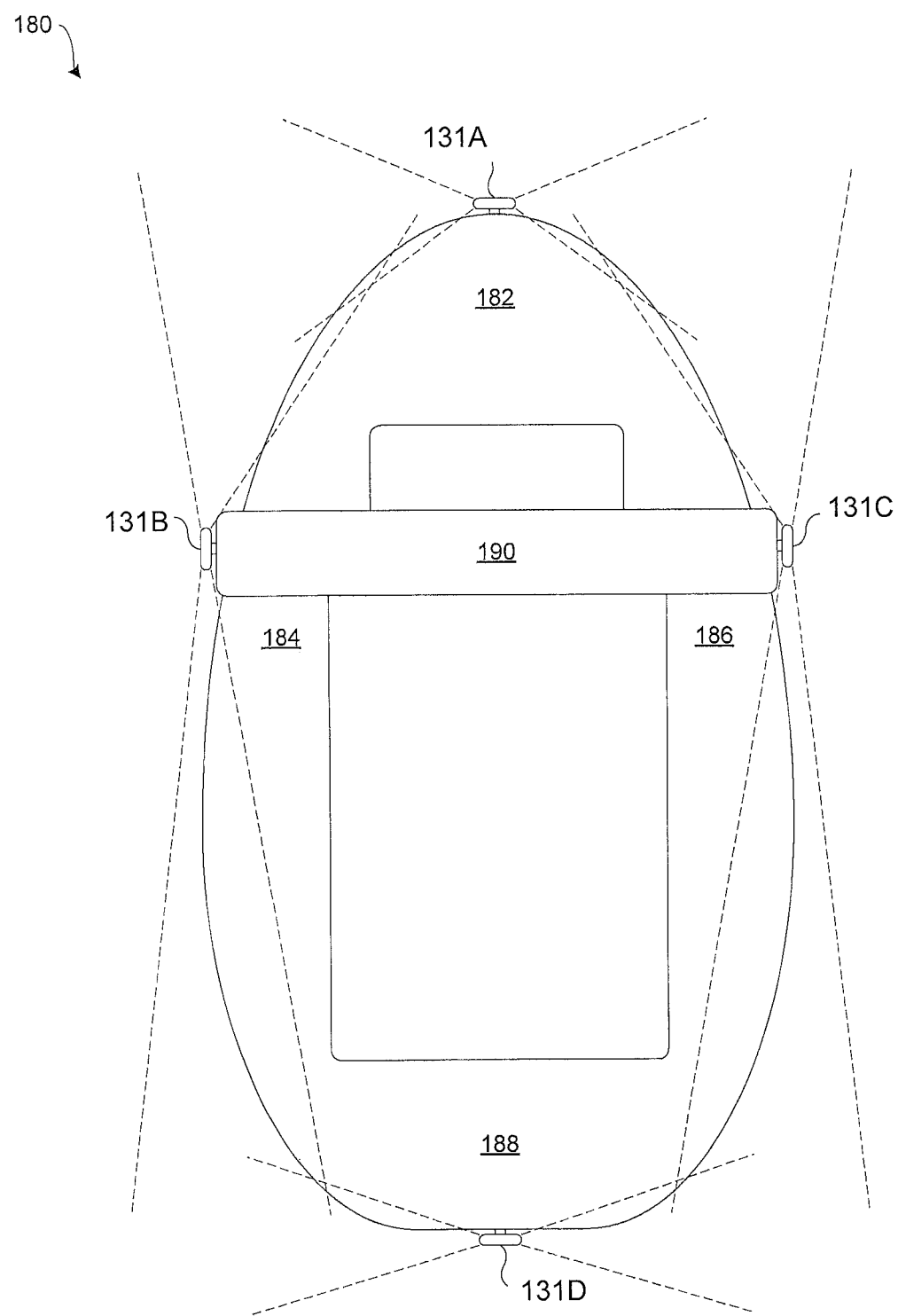
FIGS. 1B-1C show block diagrams illustrating various configurations for a monitoring system in accordance with various embodiments of the present disclosure.
Figure 1C:
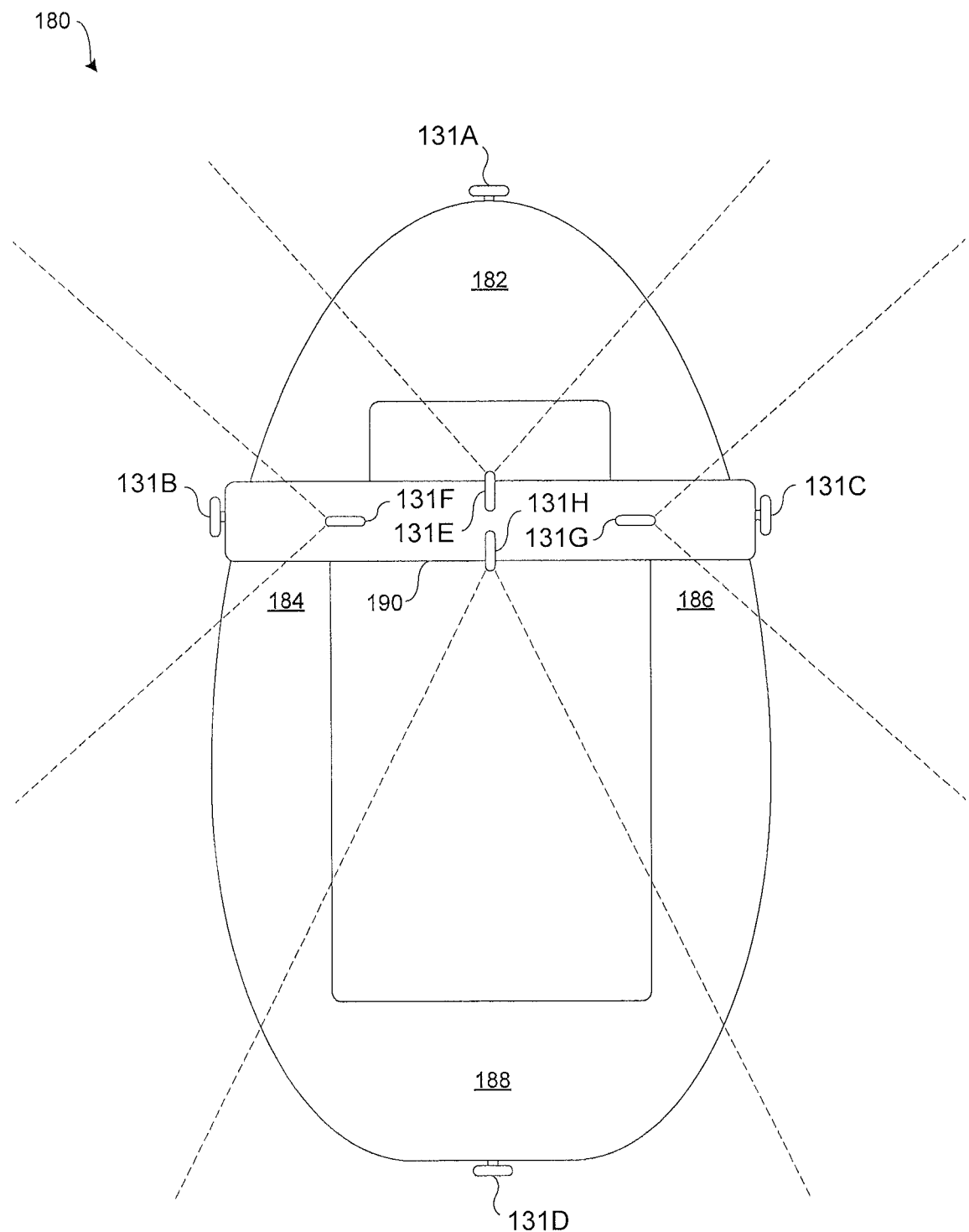

Imaging modules, such as those associated with image capture components 130A-130N, may be positioned on a watercraft above and/or below the waterline for monitoring of respective portions of a volume around the watercraft. Referring now to FIGS. 1B and 1C, the bow 182, stern 188, starboard 186, and/or port 184 portions of the watercraft as well as the base of watercraft 180 may be suitable locations for the placement of one or more monitoring modules 131A-131D each having one or more imaging modules, such as image capture components 130A-130N of FIG. 1A. Each monitoring module may also include one more sensing components 160 and/or one or more illumination components 145. In various embodiments, monitoring modules such as monitoring modules 131A-131D may all have a common set of components or monitoring modules may have different sets of components. For example, in one embodiment, each monitoring module 131 may be an imaging module. In another embodiment, each monitoring module may include an imaging component and an illumination component. In other embodiments, some monitoring modules with imaging modules may be provided without illumination components. In other embodiments, some monitoring modules may include only sensing components while other monitoring modules include imaging components. In other embodiments, some monitoring modules may include only illuminating components while other monitoring modules include imaging components and/or sensing components. In further embodiments, each monitoring module 131 may include multiple of the same type of imaging component aimed substantially in the same direction and spaced apart to provide stereoscopic imagery of the volume about mobile structure 180.

Because image capture components 130A-130N may be compact imaging modules that operate using relatively little power, if desired, large numbers (e.g., tens, hundreds, or more) of imaging modules may be disposed at various locations around the watercraft in some embodiments. Each image capture component 130A-130N may be arranged to monitor a portion of a volume (e.g., water 198 encompassing watercraft 180 within a predetermined region) in order to detect an object or objects in the volume. For example, a swimmer, debris, a dock, a man overboard (MOB), a shore, and/or other objects around the periphery of the watercraft may be detected using image capture components, such as monitoring modules including imaging modules, sensors, and/or illuminators.

The image capture components (e.g., infrared imaging modules, such as compact infrared imaging modules, non-thermal imaging modules such as visible light imaging modules, and/or image intensifier modules) and/or sensor modules (e.g., sensing components 160, such as radar systems, sonar systems, microwave systems, laser systems, gas sensor systems, etc.), or any combination thereof, may bidirectionally or unidirectionally communicate with processing component 110. For example, in one embodiment, one or more of image capture components 130A-130N and/or sensing component 160 may communicate with interface component 118, which then relays data to processing component 110. Processing component 110 may communicate with control component 150 to modify operation of a mobile structure based on image data and/or sensor data.

For example, control component 150 may be coupled to propulsion and/or steering systems of watercraft/mobile structure 180 and, when an object is detected using one or more of image capture components 130A-130N and/or sensing component 160, control component 150 may operate the propulsion and/or steering systems to position the watercraft relative to the object. For example, control component 150 may disable the propulsion system (e.g., one or more propellers or a jet) to avoid injuring a detected swimmer. In another example, the propulsion system and the steering system may be operated to steer the watercraft around a detected debris object. In another example, the propulsion system and the steering system may be operated to move the watercraft into a docking position relative to detected dock structures.

Image data for object detection and associated watercraft operation may be provided by, for example, compact infrared imaging modules (e.g., infrared cameras) and/or visual light imaging modules (e.g., a charge coupled device (CCD) or complementary metal oxide semiconductor (CMOS) imager). Sensor data for object detection and associated watercraft operation may be provided by radar systems, sonar systems, laser array systems, microwave systems, and/or other sensors and/or sensor systems mounted on or within the watercraft/mobile structure. For example, each of image capture components 130A-130N may include one or more thermal imaging modules, such as compact infrared imaging modules and/or one or more visible light imaging modules.

Further details of exemplary implementations of compact infrared imaging modules and/or image capture components as described herein are provided in U.S. patent application Ser. No. 14/101,258 which is hereby incorporated by reference herein in its entirety. Processor 110 may receive image data from image capture components 130A-130N and process the image data to reduce noise, perform other image corrections, enhance thermal images from the infrared imaging modules, and/or combine or fuse thermal and non-thermal images. Further details of image correction operations, such as scene-based non-uniformity corrections that may be performed on thermal images are provided in U.S.

patent application Ser. No. 14/099,818 which is hereby incorporated by reference herein in its entirety. Further details of image combination operations, such as fusion operations that may be performed to combine thermal and non-thermal images are provided in U.S. patent application Ser. No. 13/437,645 which is hereby incorporated by reference herein in its entirety.

In various embodiments, components of perimeter monitoring system 100A may be combined and/or implemented or not, as desired or depending upon the application or requirements, with perimeter monitoring system 100A representing various functional blocks of a system. For example, processing component 110 may be combined with memory component 120, image capture components 130A-130N, and/or control component 150. In another example, processing component 110 may be combined with image capture components 130A-130N with only certain functions of processing component 110 performed by circuitry (e.g., a processor, a microprocessor, a microcontroller, a logic device, etc.) within image capture components 130A-130N. In still another example, control component 150 may be combined with one or more other components or be remotely connected to at least one other component, such as processing component 110 via a control wire so as to provide control signals thereto and/or receive control signals therefrom.

Processing component 110 may be configured to perform object detection operations that enhance sensitivity to detection of real objects and decrease the occurrence of false alarms. For example, when a person or other object is detected using an image capture component (e.g., a swimmer is detected using a thermal image), secondary confirming detection algorithms which take into account other factors can greatly reduce false alarm rate. For example, a thermal image capture component such as an LWIR camera may only see a portion of a swimmer that is disposed above the water level. An underwater sonar device configured to look sideways in the immediate vicinity of the watercraft could be used to confirm the thermal detection is matched with a moving body underwater. For example, when a potential object is detected in a thermal image, a sonar component may be activated or an operating sonar component may provide data to processing component 110. If an object is also detected in the sonar data, an object detection may be determined. If an object is not detected in the sonar data, the potential image-based detection may be discarded and/or additional image data may be gathered or additional analysis of the image data may be performed to determine whether the potential detection is a real object. In this way, sensor data from an additional sensor may be cross correlated with image data from, for example, a thermal image capture component to provide reduced false-alarm rate detections.

Additional sensors such as underwater sonar sensors may also be configured to cooperate with processing component 110 to detect fish or other objects of interest and alert boaters to the object. For example, sea lions or other sea animals sometimes frolic in the water around the hull of a watercraft but can go unnoticed as most of the animal is located below the water with the less frequent opportunity to see their faces above water. In some cases, particularly at night, photoluminescence around moving sea creatures also occurs. Monitoring modules 131 may include image capture components and/or other sensors such as sonar sensors configured to detect the presence of the creatures underwater, a thermal signature of the creatures above and/or below the water, and/or the photoluminescence itself and alert the boaters to the scene responsive to the detection. Users may be provided with the ability to set detection parameters for alerts. For example, a user may set an alert only when photoluminescence is occurring or only when sea turtles are present.

In some embodiments, one or more of image capture components 130 may include various optical elements 135 (e.g., one or more infrared-transmissive lens, one or more infrared-transmissive prisms, one or more infrared-reflective mirrors, or one or more infrared fiber optic elements for an infrared imager) that guide infrared radiation from a scene to an FPA of infrared imaging module 100. In some embodiments, optical elements 135 may be used to suitably define or alter the field of view (FOV) of a thermal or a non-thermal imaging module. A switchable FOV (e.g., selectable by an image capture component and/or processor 110) may optionally be provided, which may be useful when, for example, a selective close-up view of a portion of a scene is desired. In some embodiments, optical elements 135 may include an actuated zoom lens arrangement and/or an image stabilization lens arrangement, which may be controlled by processing component 110.

Optical elements 135 may also include one or more filters adapted to pass infrared radiation of some wavelengths but substantially block infrared radiation of other wavelengths (e.g., short-wave infrared (SWIR) filters, mid-wave infrared (MWIR) filters, long-wave infrared (LWIR) filters, and narrow-band filters). Such filters may be utilized to tailor an image module such as an infrared imaging module or visible light imaging module for increased sensitivity to a desired band of infrared wavelengths. For example, in some situations, it may be desirable to detect exhaled breaths of a person or an animal of to detect buildup of a specific gas (e.g., a buildup of carbon dioxide on or around a watercraft due to use of a generator). In this type of situation, a better result may be achieved by utilizing a narrow-band filter that transmits only in the wavelengths matching a specific absorption/emission spectrum of carbon dioxide ($CO_2$) or other gases. In other situations it may be desirable to detect the presence of toxic gases or other dangerous chemicals by utilizing a narrow-band filter that transmits only in the wavelengths matching a specific absorption/emission spectrum of the gases or chemicals. In some embodiments, filters may be selectable (e.g., provided as a selectable filter wheel). In other embodiments, filters may be fixed as appropriate for a desired application of system 100A.

FIG. 1B shows a top-view of watercraft/mobile structure 180 having a plurality of monitoring modules 131A-131D (e.g., infrared camera modules, visible light camera modules, other sensors, and/or illuminators) mounted to watercraft 180 in accordance with an embodiment of the present disclosure. In various implementations, monitoring modules 131A-131D may each include one or more of image capture components 130A-130D and/or one or more sensor modules (e.g., an element of sensing component 160 and/or other modules 146 of FIG. 1A) adapted to capture one or more images and/or sensor data. Mobile structure 180 may represent any type of watercraft (e.g., a boat, a yacht, or a ship), aircraft (e.g., a drone, fixed wing, rotary), and/or land vehicle. In some embodiments, mobile structure 180 may be a recreational boat having, for example, one or more propellers.

As shown in FIG. 1B, a plurality of monitoring modules 131A-131D may be mounted at different positions on watercraft 180 in a manner so as to provide coverage of one or more fields of view around watercraft 180. In various implementations, a monitoring module 131A may be mounted to provide a field of view ahead of or around bow 182 (i.e. forward or fore part) of watercraft 180. As further shown, a monitoring module 131B may be mounted to provide a field of view to the side of or around port 184 (i.e. left side when facing bow 182) of watercraft 180. As further shown, a monitoring module 131C may be mounted to provide a field of view to the side of or around starboard 186 (i.e. right side when facing bow 182) of watercraft 180. As further shown, a monitoring module 130D may be mounted to provide a field of view behind of or around stern 188 (i.e. rear or aft part) of watercraft 180. More than one monitoring module, such as image capture components, may be disposed on each side and/or any other portion of the watercraft 180 and may be mounted on and/or within the hull of the watercraft 180.

Thus, in one implementation, a plurality of image capture components 130A-130N (e.g., infrared cameras such as compact thermal imaging modules) may be mounted around the perimeter of watercraft 180 to provide fields of view thereabout. As an example, and as discussed further herein, watercraft 180 may incorporate perimeter monitoring system 100A to provide swimmer or man overboard detection, or to assist during various modes of operation, such as docking or tactical debris avoidance. In some embodiments, watercraft 180 may also, or alternatively, include monitoring modules mounted to a control tower 190 as shown in the top-view of FIG. 1C.

Figure 1D:
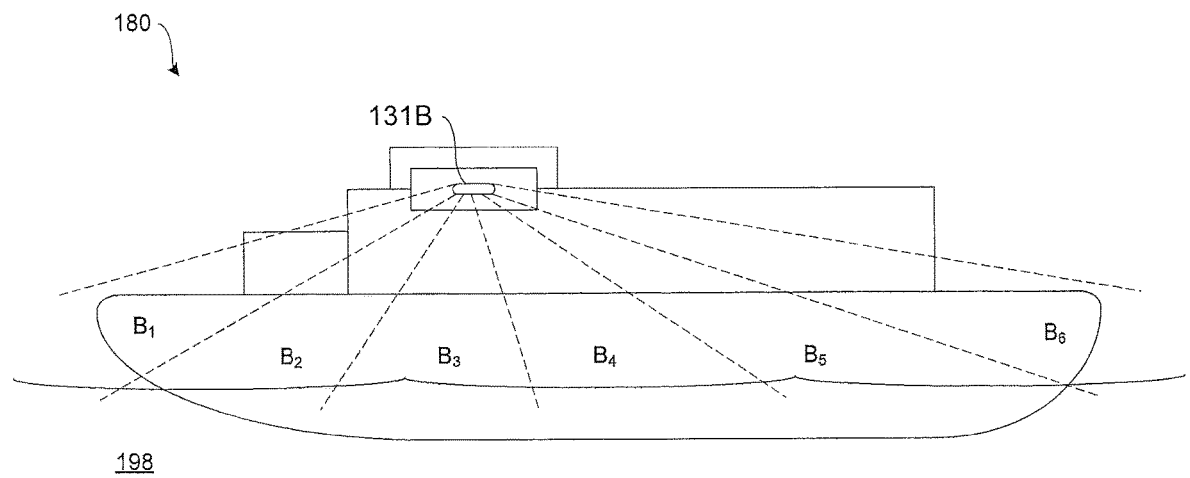
FIGS. 1D-1E show block diagrams illustrating various configurations for a monitoring system in accordance with various embodiments of the present disclosure.

FIG. 1D shows a port-side-view of watercraft 180 having port-side monitoring module 131B mounted to watercraft 180 in accordance with an embodiment of the present disclosure. As examples, monitoring module 131B may be mounted attached to or embedded within the hull or another portion of the watercraft or may be included in an add-on structure such as a pod housing having monitoring modules disposed around the periphery of the pod or in a mounting structure (e.g., a strip of material such as rubber or plastic having embedded monitoring modules). In reference to FIG. 1D, monitoring module 131B may include one or more of image capture components 130 that provide a port-side field of view around watercraft 180.

In one implementation, an image capture component 130 may provide monitoring, such as thermal image monitoring and/or non-thermal imaging monitoring, of a field of view of a port-side of watercraft 180. In another implementation, a plurality of image capture components may be disposed on the port-side of watercraft 180 so that the port-side field of view is monitored by a plurality of image capture components having a corresponding plurality of views B1-B6. For example, image capture components may be adapted to provide monitoring of one or more forward port-side views B1-B3 and one or more rearward port-side views B4-B6. Moreover, such image capture component may be adapted to provide stereographic monitoring of one or more views B1-B6. Although only the port side of watercraft 180 is shown, it will be understood that forward, rearward, and starboard portions of watercraft 180 may also be provided with one or more monitoring modules, including imaging components and/or sensor components that provide monitoring of various overlapping and/or non-overlapping fields of view around the perimeter of watercraft 180.

As further shown in FIG. 1D, the port-side fields of view B1-B6 of watercraft 180 may extend through a viewing range from the monitoring module (e.g., monitoring module 131B) to a surface of water 198 adjacent to watercraft 180. However, in various implementations, the viewing range may include a substantial portion below the water surface depending on the type of sensor utilized (e.g., visible camera, radar, sonar, or type of infrared detector based on wavelength or portion of the spectrum, and other relevant factors) and/or the location of the sensor (e.g., above and/or below the waterline).

Figure 1E:
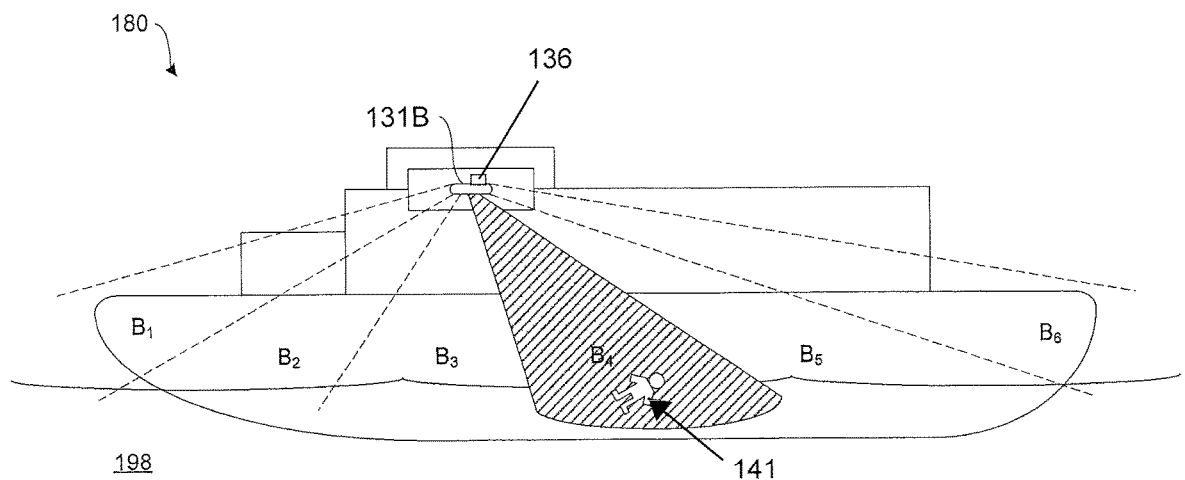

As shown in FIG. 1E, monitoring modules such as monitoring module 131B may be used to detect an object such as a person 141 in the water in the vicinity of watercraft 180. In general, monitoring modules including image capture components may be used to identify and locate an object such as a swimmer, a man overboard, debris, or dock structures in the vicinity of watercraft 180. Once the object is identified and located, processing component 110 may provide information to control component 150 to alter operation of watercraft 180 and, in some embodiments, alert an operator of a possible collision. An articulated/actuated searchlight 136 may be moved to illuminate the detected object based on the monitoring module data and used to aid in visual identification and rescue if a man overboard situation is detected. It should be understood that searchlight 136 may be separate from monitoring modules 131 (e.g., separate housing and/or control) or may be integrated as part of a monitoring module (e.g., within the same housing or enclosure).

Figure 2:
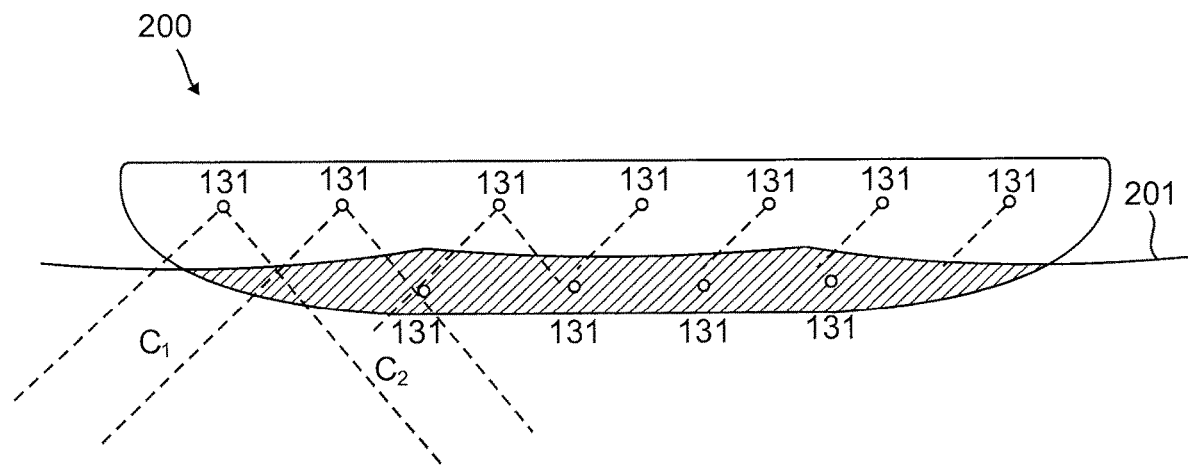
FIG. 2 shows a block diagram illustrating a configuration for a monitoring system in accordance with various embodiments of the present disclosure.

FIG. 2 shows an example of a recreational mobile structure 200 having a safety system including a plurality of monitoring modules 131 that each may include one or more imaging modules and/or one or more other sensor components. As shown in FIG. 2, monitoring modules 131 may be disposed at various locations about the exterior (e.g., on or within the hull) of mobile structure 200 so that some or all of the volume around mobile structure 200 is monitored. Alternatively, or in addition, one or more of monitoring modules 131 may include image capture components 131 with optical elements 135 including wide angle lenses, which may be used to extend a FOV for an image capture component to monitor relatively large volumes around mobile structure 180 with relatively few monitoring modules 131, for example, or to provide stereoscopic monitoring, as described herein. In various embodiments, mobile structure 200 may be a recreational boat and may have a propulsion system including a propeller.

As shown in FIG. 2, in one or more embodiments of the present invention, mobile structure 200 may include monitoring modules 131 located above and/or below the waterline 201 on or within the hull and/or implemented in a housing that can be attached to mobile structure 200. Monitoring modules 131 may have corresponding coverage fields/FOVs C1, C2, etc., which may overlap with one another to ensure full-volume coverage and/or to provide stereoscopic monitoring coverage. Each monitoring module 131 may include one or more infrared imaging modules and/or one or more non-thermal imaging modules, such as visual light imaging modules.

Figure 3:
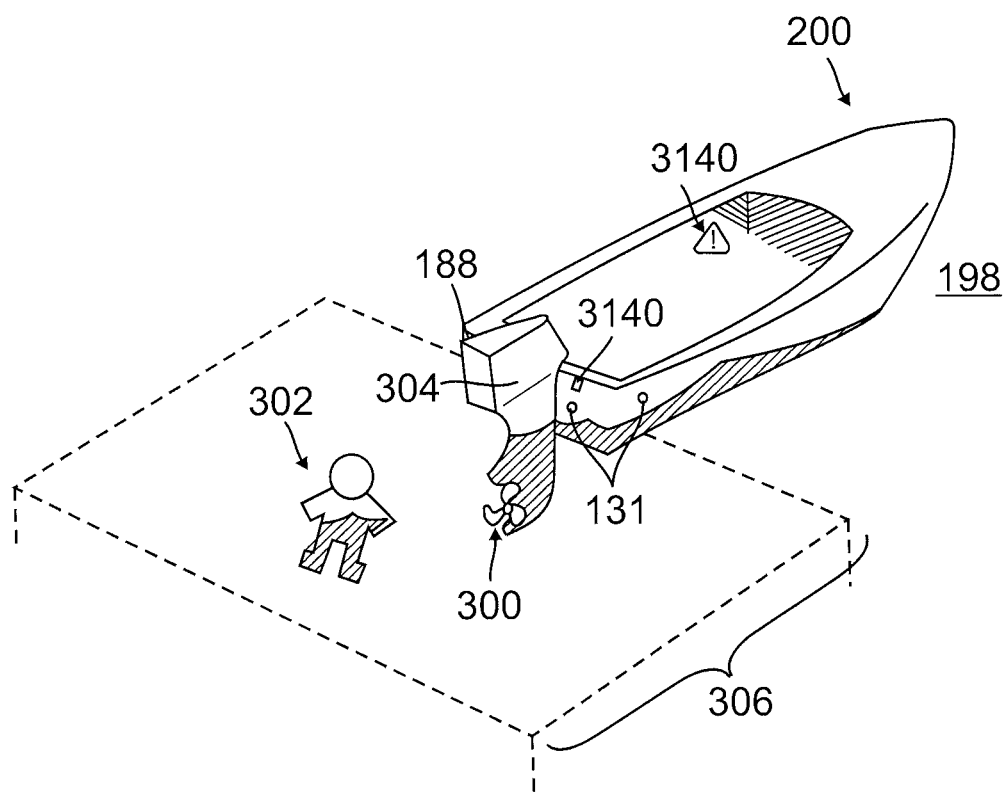
FIG. 3 shows a diagram illustrating an implementation of a watercraft monitoring system in accordance with an embodiment of the present disclosure.

FIG. 3 shows a perspective view of an illustrative embodiment of mobile structure 200 having a combined propulsion and steering system 304, such as an outboard motor. In various embodiments, a watercraft (e.g., an embodiment of mobile structure 101) may have more than one outboard motor, one or more inboard motors, and/or other combined and/or separate propulsion and steering mechanisms that can be controlled by control component 150.

As shown in FIG. 3, an object (e.g., swimmer 302) may be located in the water toward stern 188 of mobile structure 200. The swimmer 302 may not be perceived by the operator and may be at risk of contact with propeller 300. One or more image capture components associated with one or more of monitoring modules 131 may capture one or more images of the swimmer 302. For example, swimmer 302 may be detected in a thermal image captured by monitoring modules 131 by, in some embodiments, detecting a thermal excursion or difference relative to water surface 306 indicative of a human body in the surrounding medium, such as water. Providing monitoring modules 131 with thermal imaging capabilities may help detect a person in the water that may be otherwise difficult to detect or to distinguish from other types of objects based on thermal characteristics (e.g., a characteristic temperature or a temperature contrast) of a person. Monitoring modules 131 may be provided that monitor the entire periphery of watercraft 200 or a portion thereof. For example, thermal imaging modules may be provided to detect a swimmer 302 in a predefined region, such as region 306, around propeller 300. Processing component 110 may provide detected object information to control component 150, which may automatically shut off the propeller 300 when a swimmer (e.g., or a similar thermal excursion) is detected in region 306. One or more alerts may also be generated for the operator and for swimmer 302. For example, a display component 140 (see, e.g., FIG. 1A) and/or other alert components 3140, such as speakers and/or lights, may be operated to provide an alert to the passengers, the swimmer, and/or the operator. Alerts may include an audio and/or a visual signal, for example: a siren, a flashing light, a buzzer, or other types of desired alerts, as would be understood by one skilled in the art.

Figure 4:
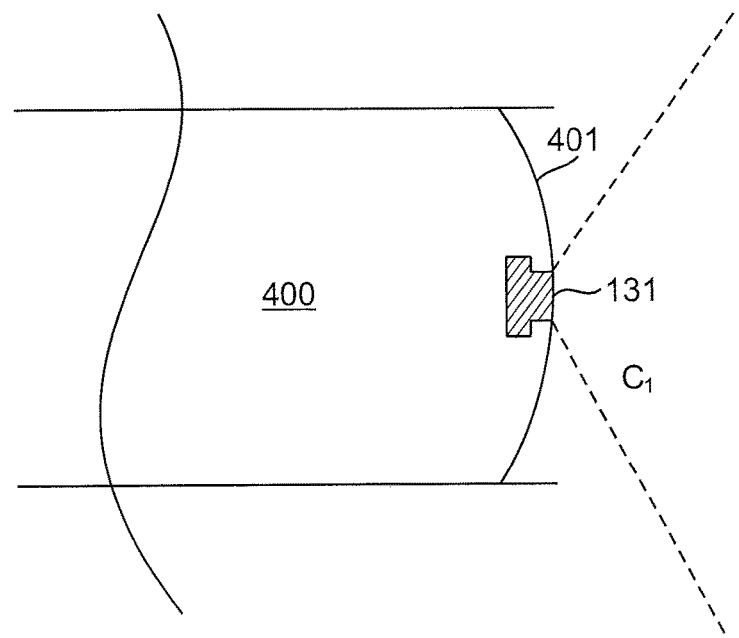
FIG. 4 illustrates a cross-sectional view of a portion of a hull including a portion of a monitoring system embedded therein in accordance with an embodiment of the present disclosure.

FIG. 4 shows an implementation of a monitoring module 131 (which may include one or more image capture components 130) disposed in a portion of a hull 400 in accordance with an embodiment. As shown in FIG. 4, monitoring module 131 may be disposed in hull 400 with a field of view C1. In the embodiment illustrated in FIG. 4, monitoring module 131 is embedded within hull 400 so that the outermost surface of monitoring module 131 is flush with the outer hull surface 401 of mobile structure 180. In other embodiments, monitoring module 131 may protrude with respect to hull surface 401, reside completely on the exterior of the hull 400, or be recessed within hull 400. The monitoring module 131 may include a waterproof housing and/or may be mounted behind a waterproof window, such as an infrared transparent window in hull 400. Monitoring module 131 may be visible from the outside of hull 400 or may be hidden from view to a human eye behind a visibly opaque yet infrared transparent cover.

Figure 5:
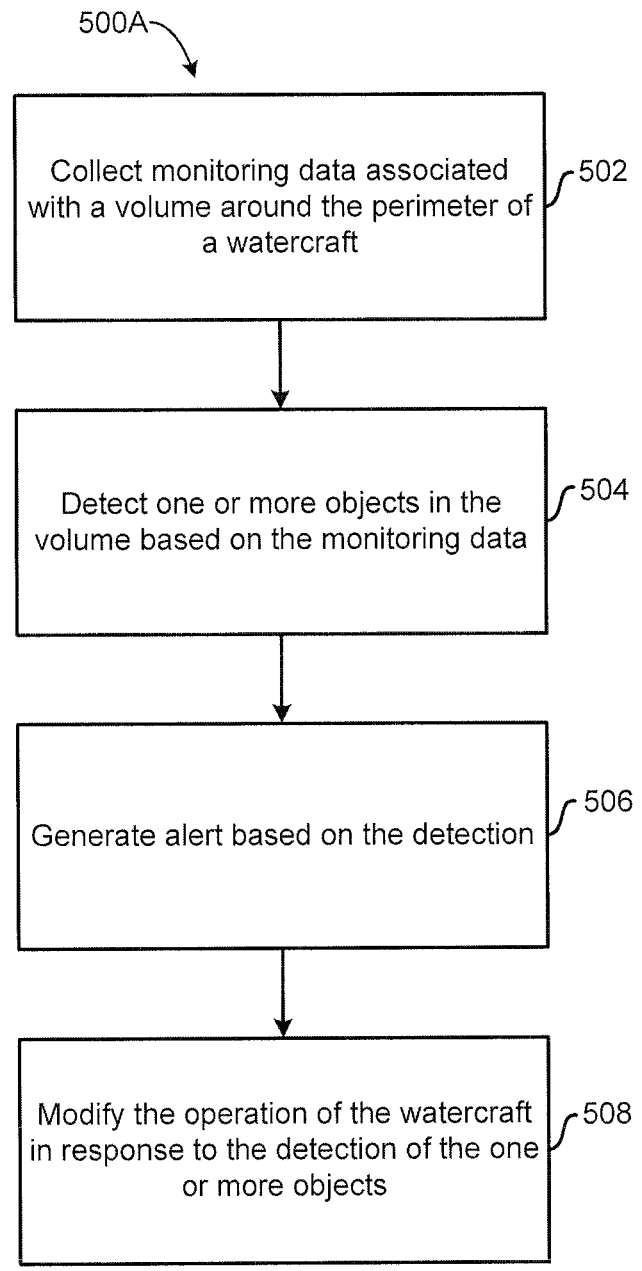
FIG. 5 shows a flow chart illustrating a method for monitoring a volume around a mobile structure in accordance with various embodiments of the present disclosure.
Figure 6:
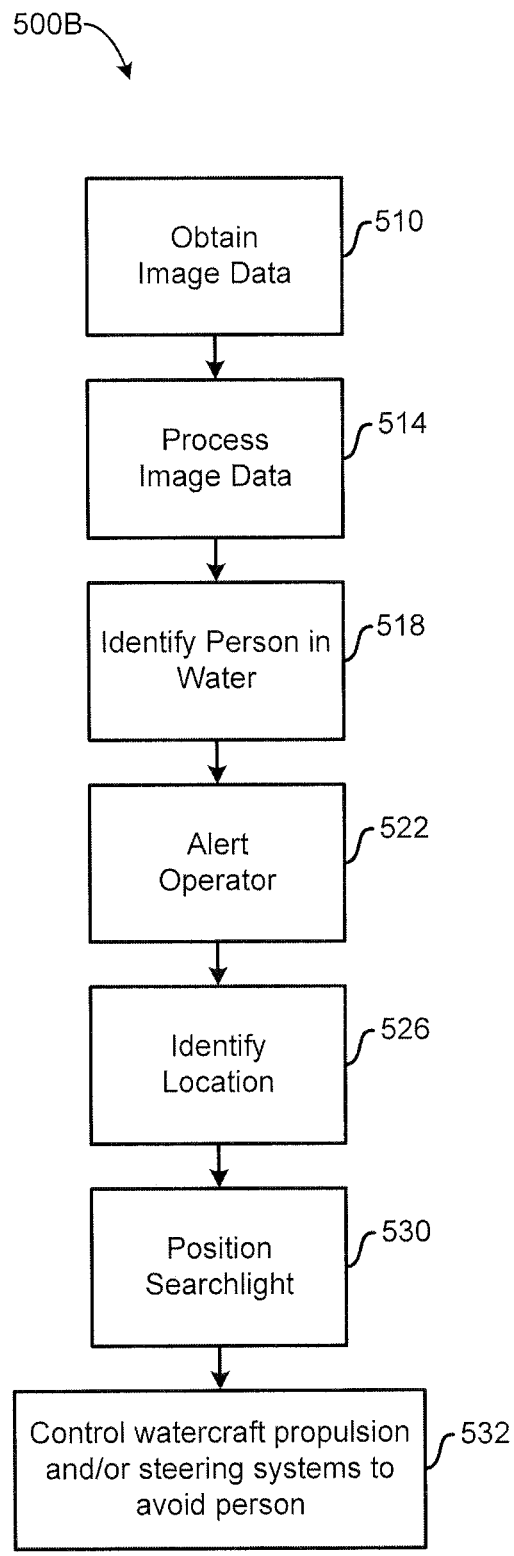
FIG. 6 shows a flow chart illustrating a method for monitoring a volume around a mobile structure in accordance with an embodiment of the present disclosure.

FIGS. 5-6 illustrates flow diagrams of processes to provide operation of a monitoring system in accordance with embodiments of the disclosure. In some embodiments, such operations may be implemented as software instructions executed by one or more logic devices associated with corresponding electronic devices, sensors, and/or structures depicted in FIG. 1A. More generally, such operations may be implemented with any combination of software instructions and/or electronic hardware (e.g., inductors, capacitors, amplifiers, actuators, or other analog and/or digital components). It should be appreciated that any step, sub-step, sub-process, or block of such processes may be performed in an order or arrangement different from the embodiments illustrated by FIGS. 5-6. For example, in other embodiments, one or more blocks may be omitted from or added to the process. Furthermore, block inputs, block outputs, various sensor signals, sensor information, calibration parameters, and/or other operational parameters may be stored to one or more memories prior to moving to a following portion of a corresponding process. Although the processes are described with reference to systems described in reference to FIG. 1A, the processes may be performed by other systems different from those systems and including a different selection of electronic devices, sensors, assemblies, mobile structures, and/or mobile structure attributes.

Process 500A of FIG. 5A provides illustrative operations that may be performed for monitoring a volume around a mobile structure, such as a watercraft. In block 502, the monitoring system may collect monitoring data associated with a volume surrounding the perimeter of a watercraft. The monitoring system may include various monitoring modules including infrared imaging modules, visual imaging modules, sonar systems, radar systems, tripwire modules, laser array systems, or a combination thereof. Thus, the monitoring data may include infrared images, visual images, radar data, sonar data, laser data, air quality sensor data, or any combination thereof (e.g., fused thermal and non-thermal images). Collecting the monitoring data may include capturing one or more thermal images and/or one or more non-thermal images of a portion of the volume, including stereoscopic images. Collecting the monitoring data may include receiving, at a receiver of a sensing component, signals corresponding to an echo from an object, such as a sound echo signal in a sonar module or a light or electromagnetic wave echo in a laser or radar system.

In block 504, one or more objects may be detected within the volume based on the monitoring data. For example, a swimmer, debris, a dock, or a man overboard (MOB) may be detected by the monitoring system. For example, a swimmer in a predetermined region around a propeller of a recreational boat may be detected in a thermal image of the region.

In block 506, an alert may be generated based on the detection. The alert may be provided by a display component 140 and/or other alert components and may be directed at the operator, passengers, a Harbormaster, a swimmer, another watercraft (e.g., a tugboat or a ship being moved by a tugboat) or a combination thereof. The alert may be a visual and/or audio signal such as a siren, a flashing light, or a buzzer. For example, an alarm may be sounded from the rear portion of the boat to alert the swimmer. The alert may include information about the detected object. For example, the alert may include a range to the detected object and/or bearings to the detected object. The range and/or bearings may be determined based on a triangulation based on the known positions and orientations of imaging modules and/or based on additional sensor data. The alert may include an image of the detected object.

In block 508, the operation of the watercraft may be modified in response to the detection of the one or more objects. Information associated with the location and/or type of detected object may be extracted from, for example, thermal images of the volume and resulting control signals may be directed from the processing component 110 to control component 150. Control component 150 response may include activation/deactivation of the propulsion system (e.g., engine cutoff), operation of steering (e.g., tactical avoidance and/or auto or assisted docking), and/or acceleration/deceleration of the watercraft (as examples). For example, in the scenario in which a swimmer is detected at the rear of the boat, a propeller of the boat may be shut off (e.g., by cutting power to the propeller).

In an example of an embodiment, monitoring modules 131 may detect debris that may be a danger to the propeller of the watercraft (e.g., a high concentration of sargassum seaweed or an abandoned waterski rope) and/or the hull of the watercraft (e.g., ice, wood, or other floating debris). The monitoring modules 131 may detect the debris and provide detection information to, for example, processing component 110. Control component 150 would then receive control signals based on the detection information from the processing component 110. Control component 150 may then change the course of the watercraft, for example, to maneuver away from the high-risk location with the debris.

In another embodiment, the watercraft may use monitoring modules 131 for assisted docking; for example, for a large yacht with limited docking visibility for the operator. As another example, assisted docking may be provided for rental watercraft such a rental ski boats so that inexperienced operators (e.g., renters) do not damage the boat when docking. The monitoring modules 131 may detect the dock, pylons, and/or other structures or other boats and, based on the detections, system 100A (e.g., processing component 110 in cooperation with control component 150) may aid the watercraft in navigating by avoiding other docked watercrafts in close quarters, and/or alerting the operator via the display component 140 as to the watercraft's proximity and orientation relative to the dock. The control component 150 may direct the watercraft to maneuver toward the dock and also alter the watercraft's steering and propulsion to further assist with docking completion.

In another example of an embodiment of the present disclosure, the watercraft (e.g., a cargo ship, a cruise ship, or a military vessel) may be escorted by one or more tugboats. The monitoring modules 131 may detect the watercraft drifting toward a temporarily halted tugboat and/or a moving tugboat drifting or motoring toward the watercraft. The control component 150 may automatically activate reverse propulsion or otherwise propel and/or steer the watercraft to preserve or increase the distance between the tugboat and watercraft.

FIG. 6 shows a flow chart of illustrative operations that may be performed when a detected object is a person in the water (e.g., a man overboard such as a person that is falling or has fallen from a ship or a swimmer in the vicinity of a boat). As shown in FIG. 6, in block 510, image data, such as thermal images of a portion of a volume surrounding a mobile structure, may be obtained. In various implementations, the image data may be obtained directly from an image capture component 130 or from storage in memory component 120.

In block 514, the obtained image data may be processed. Processing the image data may include performing various image correction operations (e.g., scene-based non-uniformity correction operations, flat field corrections, etc.) and/or combining thermal and/or non-thermal images. In one implementation, the obtained image data may be processed to determine (e.g., detect) an object (e.g., a person in the water) within the volume around the watercraft 180 (e.g., a volume monitored by the imaging modules 130A-130N of FIG. 1A).

In block 518, the detected object may be identified from the processed image data as a person in the water. In one implementation, the person may be distinguished from the water in which the person is located based on a temperature difference therebetween. For example, when a person having a body temperature of approximately 98 degrees falls into the water having a water temperature of approximately 60-70 degrees or less or other temperature that is different from the body temperature, the difference between the temperatures is viewable and detectable with an infrared image, and therefore, the person may be quickly identified and located in the water.

In various embodiments, various types of image processing operations may be performed by processing component 110 to perform image analysis to monitor the image data and detect a person. For example, threshold conditions or object discrimination, for example, to distinguish non-living objects, such as a deck chair or other inanimate objects from a person, may be performed. Threshold factors such as temperature, shape, size, aspect ratio, velocity, or other factors may be used in discriminating images of non-living and/or non-human or non-living objects from images of humans/living objects. Thus, threshold conditions for use as desired in a given application may provide that a bird flying through a camera's field of view, for example, may be ignored, as would a falling deck chair or cup of hot coffee thrown overboard.

When a swimmer is endangered or a man overboard condition is suspected or determined, an operator (e.g., crew member) may be alerted or notified in block 522 so that a rescue action may be initiated. In various implementations, this alert or notification may comprise an audio signal and/or visual signal such as an alarm, a warning light, a siren, a bell, a buzzer, or other types of alerts. In block 526, the specific location of the person may be identified based on the image data block 526. In one implementation, identifying the location of the person may include narrowing the field of view of an image capture component 130. For example, a lens of the infrared camera may telescope to a position to zoom-in on the object or person in the water or zoom-in on at least the proximate location of the person in the water or another narrower field of view. Processing component 110 may be configured to determine, based on a known position and/or orientation of image capture component 130, the direction towards and/or distance to the detected person and/or object in the water. In some embodiments, where image capture component 130 and/or the monitoring module is articulated (e.g., has an actuated orientation controlled by processing component 110), image capture component 130 may be directed at the proximate location of the person in the water to further refine the location of the person. In block 530, a searchlight (e.g., searchlight 136) may be directed to the proximate location of the person in the water to assist with the retrieval and rescue of the person. Other sensor data may also be used to identify the location. For example, radar and/or sonar data may be used to determine a distance and direction to the person from the watercraft.

In various embodiments, the time and/or location of the event may be recorded along with the image data (e.g., as part of blocks 522 or 526) such as to aid in the search and rescue operation and/or to provide information for later analysis of the suspected man overboard event. Alternatively, the time and/or location may be regularly recorded with the image data. For example, processing component 110 may include a location determination function (e.g., referencing a global positioning system (GPS) receiver or other location determination techniques) to receive precise location and/or time information, which may be stored (e.g., in memory component 120) with the image data. In some embodiments, in block 532, the operation of the watercraft may be modified based on the detected person. For example, the propulsion and/or steering systems of the watercraft may be controlled based on the detection in the thermal images to avoid a collision with the person in the water, to steer toward the person in the water, and/or to cut power to the propulsion system to avoid injuring and/or leaving behind the person in the water.

In some embodiments, monitoring modules 131 for a watercraft may be provided in a modular housing that can be attached to a watercraft. In this way, safety systems may be provided for a variety of different watercraft that, following factory calibration of the monitoring modules, can be installed or otherwise implemented in an existing watercraft.

Figure 7:
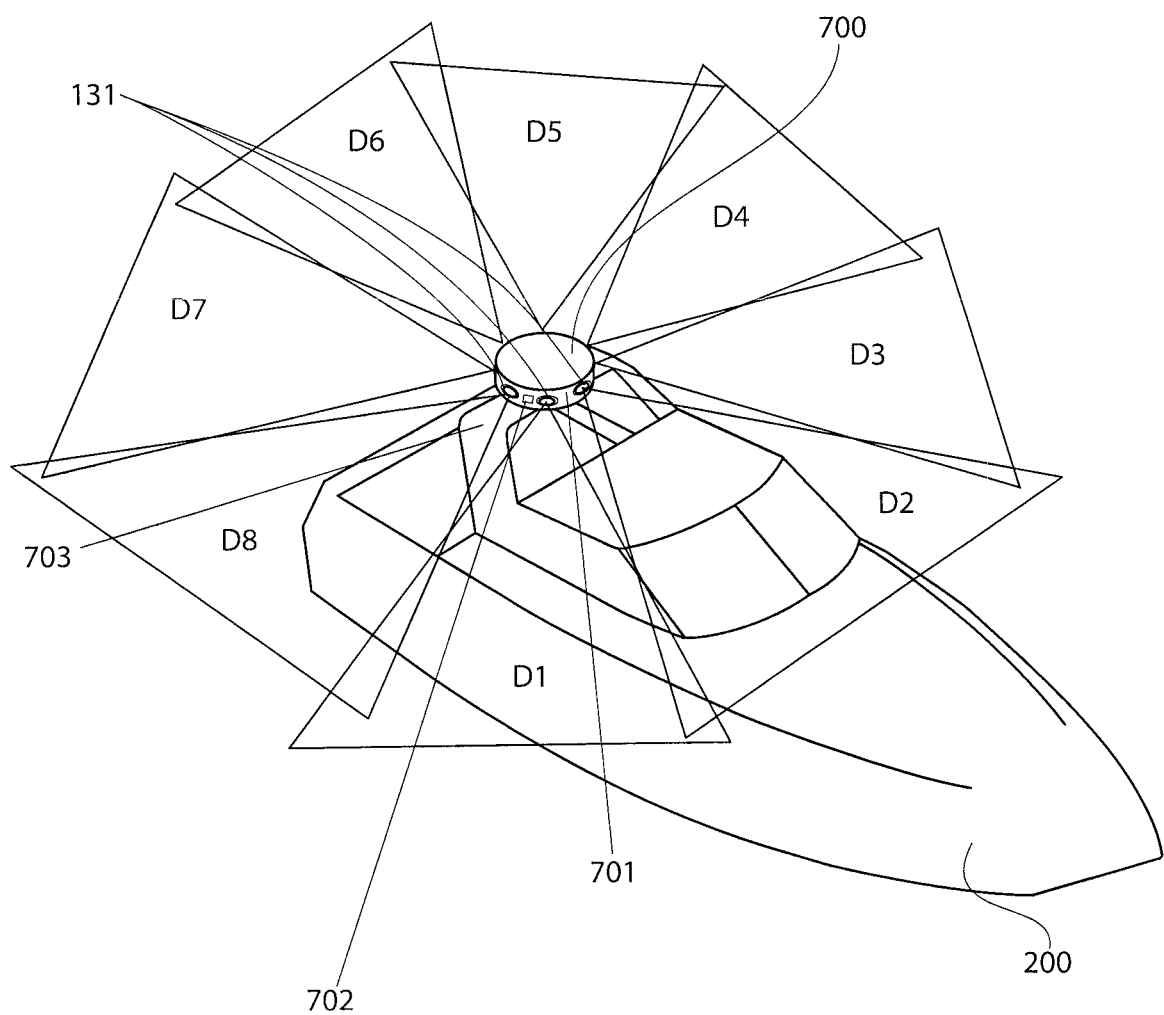
FIG. 7 shows a diagram illustrating a perspective view of a watercraft including a pod-based monitoring system in accordance with various embodiments of the present disclosure.

For example, FIG. 7 shows an example of a recreational watercraft 200 having a pod-based safety system 700 including a plurality of monitoring modules 131 mounted in a housing that is attached to the watercraft.

As shown in the example of FIG. 7, housing 701 of pod 700 may be an approximately cylindrical housing in which monitoring modules 131 are mounted. For example, housing 701 may include one or more openings in which monitoring modules 131 can be mounted. As shown, one or more additional components 702 may also be included in pod 700. For example, components 702 may include one or more of illumination component 145, sensing component 160, and/or other modules 145. In one embodiment, monitoring modules 131 may include image capture components disposed in a radar pod in which a rotating radar transmitter/receiving apparatus is disposed. Monitoring modules 131 and optionally components 702 may be disposed about a circular (e.g., cylindrical) outer surface of the housing such that each monitoring module monitors a partially overlapping portion of the periphery of the watercraft. For example, each monitoring module 131 may include an image capture component 130 having a FOV (see, e.g., fields of view D1-D8 of FIG. 7) that at least partially overlap with the FOV of a neighboring image capture component. In some embodiments, each monitoring module 131 may include multiple image capture components, where each monitoring module is configured to provide stereoscopic monitoring of one or more of fields of view D1-D8.

Images of the volume within fields D1-D8 captured by imaging components of monitoring modules 131, such as infrared cameras, may be stitched to generate a continuous mosaic image of some or all of the volume around the watercraft. The stitched image may be provided to an operator of the watercraft (e.g., using a display such as display component 140 of FIG. 1A) and/or analyzed to detect objects in the water surrounding the watercraft. Pod-based system 700 may include memory that stores calibration information for monitoring modules 131. For example, the overlap of fields of view D1-D8 may be calibrated in the factory during manufacturing operations so that images from individual image capture components can be stitched to form the mosaic image.

The relative positions and pointing angles of imaging components in pod 700 may also be calibrated during manufacturing so that the range and bearing to an object detected in captured images can be determined (e.g., triangulated) using the captured images. Calibration information for image stitching, ranging, and/or bearing determination may be stored in memory associated with pod 700 and/or other memory of watercraft 200. As described herein, other sensors (e.g., sonar, radar, laser, or other sensors) may be used, alone or in combination with the imaging components to determine the range and/or bearing to detected objects. The operation of watercraft 200 may be modified based on the detection, the range, and/or the bearing. An alert may be generated based on the detection, the range, and/or the bearing.

As shown in FIG. 7, pod 700 may be mounted on a mounting structure 703 that extends above the deck of the watercraft so that monitoring modules 131 have an elevated view of the periphery of the watercraft. However, this is merely illustrative. In other embodiments, monitoring modules 131 may be disposed on or within the hull of watercraft 200, disposed in a pod mounted at other suitable locations on the watercraft, or may be provided in other modular housing configurations.

Figure 8:
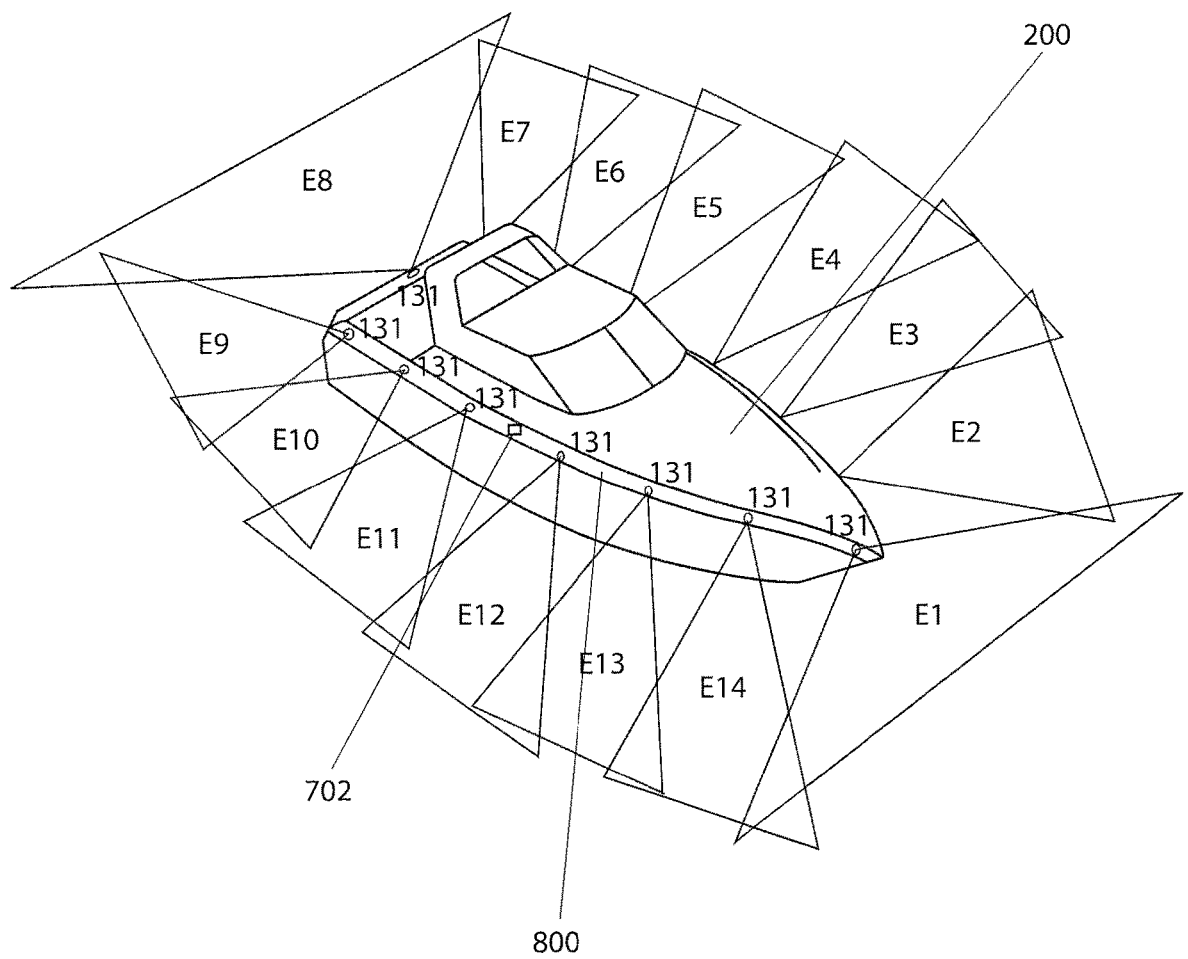
FIG. 8 shows a diagram illustrating a perspective view of a watercraft including a strip-mounted monitoring system in accordance with various embodiments of the present disclosure.

For example, FIG. 8 shows another embodiment of a modular housing configuration for a watercraft safety system. As shown in FIG. 8, monitoring modules 131 and optionally components 702 may be disposed in a strip housing 800. Strip housing 800 may have a shape that is complementary to a shape of a portion of the watercraft, such as a perimeter of the watercraft, such that, when the strip is attached to the watercraft, the strip extends continuously along the portion of the watercraft. Monitoring modules 131 (e.g., image capture components and/or other sensor components) may be disposed at regular or irregular intervals along the strip. Strip housing 800 may be formed from a plastic, metal, rubber, or other material and may be attached to watercraft 200 using adhesives and/or mechanical mounting members such as screws, clips, bolts or other fasteners.

Each monitoring module 131 may include an image capture component 130 having a field of view (see, e.g., fields of view E1-E14 of FIG. 8) that at least partially overlaps with the field of view of a neighboring monitoring module. The fields of view of each image capture component may be sufficiently wide that the majority (e.g., greater than 50%, greater than 70%, greater than 90%, greater than 95%, or greater than 99%) of the near field area around the boat (e.g., the area of the water surface up to and including the hull of the boat) is covered by overlapping fields of view. In some embodiments, each monitoring module 131 may include multiple image capture components 131 configured to provide stereoscopic imaging of the volume around mobile structure/watercraft 200.

Images of the volume within fields E1-E14 captured by imaging components of monitoring modules 131, such as infrared cameras, may be stitched to generate a continuous image of some or all of the volume around the watercraft. The stitched image may be provided to an operator of the watercraft (e.g., using a display such as display component 140 of FIG. 1A) and/or analyzed to detect objects in the water surrounding the watercraft. Monitoring modules of strip housing 800 may be communicatively coupled to a memory that stores calibration information for monitoring modules 131 in strip housing 800. For example, the overlap of fields of view E1-E14 may be calibrated in the factory during manufacturing so that images captured by neighboring image capture components can be stitched together without substantial error or further image processing to determine the overlapping portions from the images themselves.

The relative positions and pointing angles of imaging components in strip 800 may also be calibrated during manufacturing so that the range and bearing to an object detected in captured images, including stereoscopic images, can be determined (e.g., triangulated) using the captured images. Calibration information for image stitching, ranging, and/or bearing determination may be stored in memory associated with strip 800 and/or other memory of watercraft 200 and/or system 100A. As described herein, other sensors (e.g., sonar, radar, laser, gas or other sensors) may be used, alone or in combination with the imaging components to determine the range and/or bearing to detected objects. The operation of watercraft 200 may be modified based on the detection, the range, and/or the bearing. An alert may be generated based on the detection, the range, and/or the bearing.

Monitoring modules 131 may protrude with respect to strip housing 800, reside completely on the exterior of housing 800, or be recessed within housing 800, as described herein. Monitoring modules 131 may be visibly apparent in housing 800 or may be hidden from view to the human eye. Watercraft 200 may be provided with one or more strips 800 for various portions of the watercraft (e.g., a bow strip, a stern strip, a starboard strip, and/or a port strip) each configured to monitor the corresponding portion of the periphery of the watercraft.

In any of the embodiments discussed herein, each monitoring module 131 may include an imaging component (e.g., an implementation of one of image capture components 130 as discussed herein) having a field of view that at least partially overlaps with the field of view of a neighboring image capture component and/or monitoring module. The fields of view of each image capture component may be sufficiently wide that the majority (e.g., greater than 50%, greater than 70%, greater than 90%, greater than 95%, or greater than 99%) of the near field area around the boat (e.g., the area of the water surface up to and including the hull of the boat) is covered by overlapping fields of view. Moreover, each monitoring module 131 may include multiple image capture components configured to provide stereoscopic image monitoring of the volume near the mobile structure, for example, or multiple monitoring modules 131 (e.g., each including one or more image capture components) may be configured to provide stereoscopic image monitoring of the volume near the mobile structure.

Figure 9:
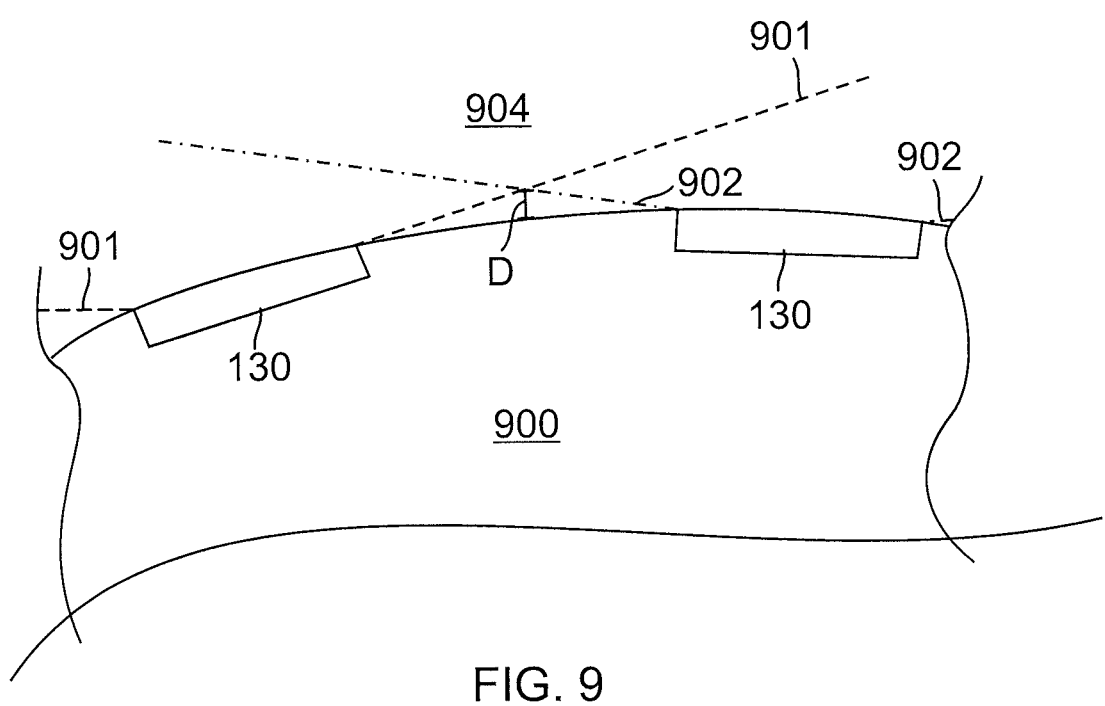
FIG. 9 illustrates a cross-sectional view of a portion of a hull including a monitoring system configured with overlapping fields of view in accordance with an embodiment of the present disclosure.

As shown in FIG. 9, neighboring image capture components 130 (e.g., which may correspond to individual monitoring modules) located on or within a structure 900 such as a hull, pod housing, or strip housing, or other mounting member, may have respective fields of view (as indicated by dashed lines 901 and 902 in FIG. 9) that overlap such that substantially all of the volume 904 around the watercraft located further than a distance D is covered by their overlapping fields of view. Distance D may, as examples, be zero centimeters (cm), 1 cm, 5 cm, 10 cm, 1 m, or any other suitable distance for monitoring the periphery of the watercraft. For example, optical elements 135 of the image capture components may include wide angle or ultra wide angle (e.g., fisheye) lenses that capture substantially hemispherical views. Processing component 110 may be configured to remove lens distortions associated with wide angle or other lenses or optical components prior to displaying images or analyzing images for object detection. The overlapping volumes imaged by each image capture component may be relatively calibrated during manufacturing or real time (e.g., based on common targets in images from adjacent image capture components). Based on this calibration and the known relative location of the image capture components/camera modules, distances to detected objects may be determined, such as by triangulation (e.g., in response to a detection trigger).

Figure 10:
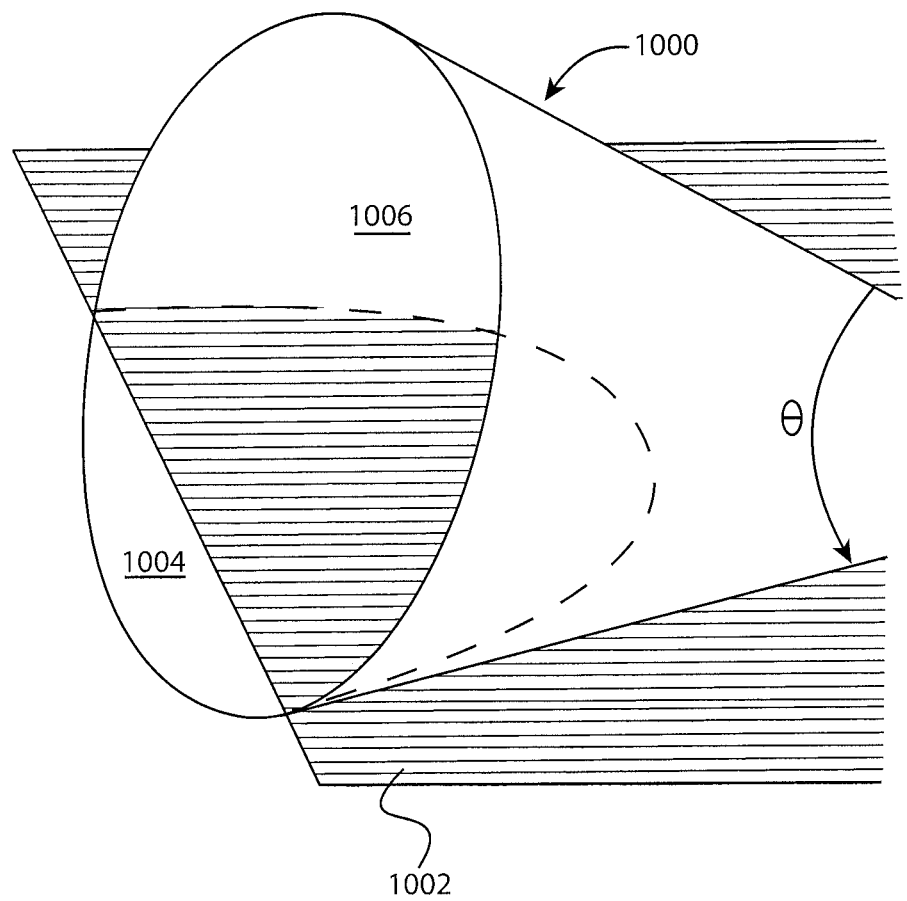
FIG. 10 illustrates a perspective view of a field of view of an image capture component and/or a monitoring module for a monitoring system in accordance with an embodiment of the present disclosure.

In some circumstances, (e.g., under calm conditions in which the water level around the watercraft is substantially stable) such as when doing close quarter maneuvering/docking operations, the height from the water (e.g., to an image capture component) may be known. As shown in FIG. 10, an image capture component may have a field of view 1000 in which the water surface 1002 cuts through the camera viewing volume at a known trigonometry (e.g., the field of view 1000 may include a portion 1006 above the water surface 1002 and a portion 1004 below the water surface). In this way, the distance and orientation of the water surface in captured images may also be used to calibrate the distances to imaged objects.

Figure 11:
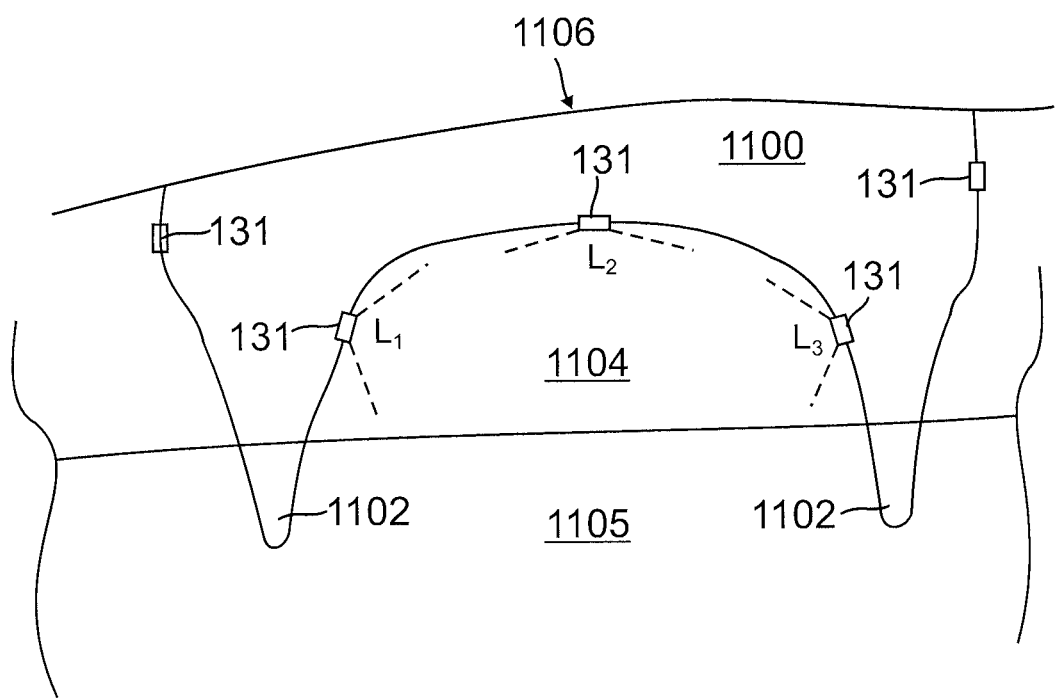
FIG. 11 illustrates a cross-sectional view of a portion of a multihull mobile structure including a monitoring system in accordance with an embodiment of the present disclosure.

As shown in FIG. 11, monitoring modules 131 may be provided for multihull boats such as multihull boat 1100 (e.g., a catamaran, a trimaran or other watercraft having multiple hulls). As shown, multihull boat 1100 may include first and second hulls 1102 extending downward from a central portion 1106 (e.g., a cabin, a cockpit or other inter-hull portion of the watercraft). Hulls 1102 and central portion 1106 may form a cavity 1104. Monitoring modules 131 may be arranged on or within hulls 1102, central portion 1106 or elsewhere on the watercraft to monitor cavity 1104 and/or other cavities associated with the watercraft. For example, an alert may be generated and/or operation of the watercraft may be modified if a person is detected swimming in cavity 1104 or if a hazardous object is detected in the cavity. Monitoring modules 131 in cavity 1104 may include components for monitoring the air quality in the cavity. For example, one or more of monitoring modules 131 may include a gas sensor (e.g., a carbon monoxide sensor) and/or one or more of monitoring modules 131 may include a filter for an infrared image capture component that selectively passes light generated by a particular gas such as carbon monoxide for detection of potentially hazardous gas buildup in cavity 1104.

For example, multihulled houseboats are often large enough to that large water surface areas are provided under the vessel between the hulls. Such watercraft are often used in hot weather where the shade under the vessel presents relief that may entice swimmers to reside between the hulls. For example, a swimmer in cavity 1104 may not be seen or heard nearly as well as in open water outside the perimeter of the vessel, and so the swimmer can present a hidden danger to operation of the houseboat. When such watercraft is moored, their users often use a generator for electricity. Such generators create carbon monoxide, which is heavier than air, that can collect under the houseboat and present a lethal danger to swimmers in cavity 1104. In order to detect such swimmers and alert the swimmers or a boat operator and/or turn off a generator or turn on an exhaust fan, monitoring modules 131 in cavity 1104 may include air quality sensors, boat generator status (e.g., on/off) monitors, or other sensors or modules (e.g., infrared image capture components) to identify and notify users when it is not safe to swim under or near the watercraft.

There is utility in presenting a variety of maritime sensor data in a stereoscopic format to give depth cues and the ability to accurately judge distances in the sensor data to a ship's pilot and crew. Thermal infrared stereo imaging can make it much easier to navigate difficult waterways in low light conditions. Stereoscopic display of three dimensional nautical charts combined with thermal infrared imaging and, optionally, sonar and/or radar data provide an immersive experience for a vessel operator to enhance safety in navigation.

For example, it can be hard to steer a ship at night into port around obstacles using non stereoscopic thermal imaging because non stereoscopic thermal imaging typically lacks intrinsic and/or recognizable depth cues. A stereoscopic thermal infrared imaging system provides the operator the stereoscopic depth cues, but in the thermal infrared waveband. The stereo thermal imaging data can be generated from two or more image capture components that are fixed mounted and looking in similar directions or a matched pair of image capture components coupled to a pan/tilt mounting system, which can be controlled by processing component 110, for example.

Video analytics can be applied to the stereo image data from these image capture component arrays to produce TIDAR (e.g., thermal infrared detection and ranging, or thermal imaging detection and ranging), which can be a thermal image dataset that contains distances to imaged objects as measured by the parallax shift between the two constituent thermal images. The stereo baseline (e.g., the distance between the image capture components) can be much larger than the distance between human eyeballs, giving a hyperstereoscopic view with enhanced depth accuracy.

In a similar vein, nautical chart data may be provided in a three dimensional form, and the chart data can be viewed from any arbitrary view. System 100A may be configured to synthesize a stereoscopic view of the environment around the ship from the nautical chart data and this view can be displayed on a three dimensional display device, such as embodiments of display component 140, as described herein. Thermal stereo image data, non-thermal stereo image data, sonar data, radar data, and/or other sensor data can be overlaid onto the stereo nautical chart, giving the operator a comprehensive view of the nautical environment, which can include objects detected in a volume around a mobile structure, such as watercraft 180.

Figure 12:
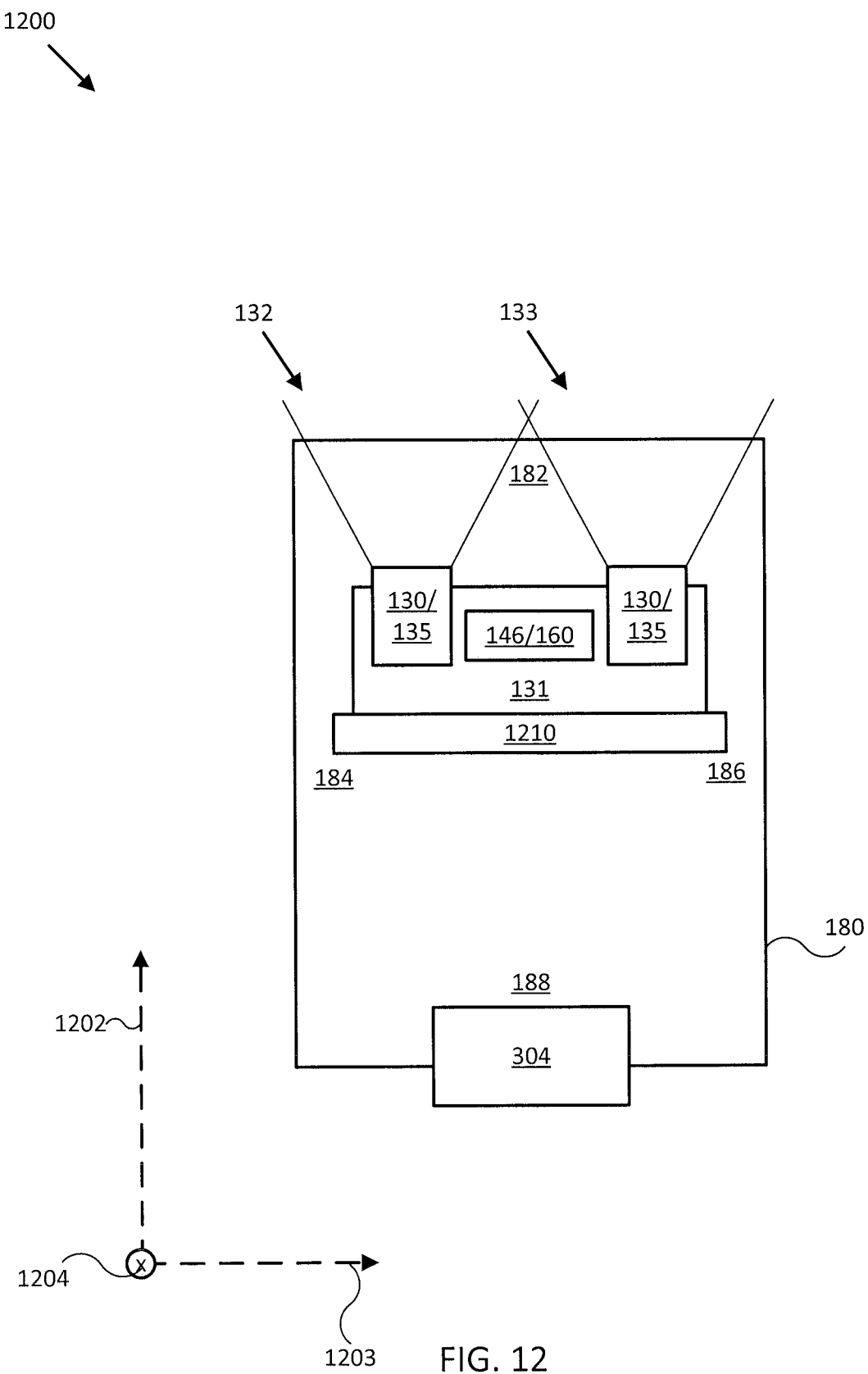
FIG. 12 shows a block diagram illustrating a configuration for a monitoring system in accordance with various embodiments of the present disclosure.

FIG. 12 shows a block diagram 1200 illustrating a configuration for a monitoring system in accordance with various embodiments of the present disclosure. As shown in FIG. 12 monitoring module 131 is coupled to mobile structure/watercraft 180 using mounting system 1210. In the embodiment presented by FIG. 12, monitoring module 131, which may be implemented as a stereoscopic monitoring module, includes two image capture components 130 with optional optical elements 135 and configured to image a volume near mobile structure 180 according to overlapping FOVs 132, 133. Also, shown are optional other modules 146/sensing components 160 integrated with monitoring module 131, which may include one or more radar, sonar, lidar, GPS, orientation sensors, actuators, and/or other sensors and/or modules that can be used to generate a stereoscopic view of the volume around mobile structure 101 using monitoring module 131. In some embodiments, monitoring module 131 may be implemented with one or more illumination components, as described herein.

Mounting system 1210 may be implemented as a fixed mounting system, for example, to provide a fixed stereoscopic view relative to mobile structure 101, or mounting system 1210 may be implemented as an articulated mounting system configured to orient monitoring module 131 according to control signals provided by processing component 110, such as control signals to aim monitoring module 131 towards a detected object or along a selected orientation relative to mobile structure 101. In embodiments where mounting system 1210 is articulates, mounting system may be configured to rotate monitoring module 131 about one or more axes (e.g., centered proximate monitoring module 131), such as longitudinal axis 1202, lateral axis 1203, and/or vertical axis 1204 (e.g., roll, pitch, and/or yaw, respectively).

In various embodiments, monitoring module 131 may be used to generate visible light, infrared, and/or thermal stereoscopic imagery of a volume surrounding mobile structure 101. Display component 140, which may be implemented as near-eye stereoscopic goggles and/or an autostereoscopic display, may be used to present such stereoscopic view to a user. In some embodiments, such stereoscopic goggles may be implemented with head tracking sensors, for example, and mounting system 1210 may be configured to pan/tilt monitoring module 131 to substantially match a viewing orientation of the user/stereoscopic goggles.

Each image capture components 130 and/or optical elements 135 may be implemented with a compact imaging module (e.g., an FPA of sensors) with a wide FOV and/or actuated zoom (e.g., controllable by processing component 110). In some embodiments, monitoring module 131 may be implemented with a pair of thermal imaging modules and a pair of visible light imaging modules, which may be used to capture overlapping thermal and visible light stereoscopic images. Such overlapping thermal and visible light stereoscopic images may be blended together and/or processed to form high contrast thermal images, for example, and/or to provide true color thermal imagery (e.g., such as to provide accurate reproduction of lighted buoy colors). In some embodiments, the visible light imaging modules may be implemented as low light monochrome cameras.

In some embodiments, each image capture components 130 and/or optical element 135 may be configured to apply a zoom level to captured images to substantially match the perspective of a user on mobile structure 180, such that the angular size of objects presented on display component 140 is substantially the same as that seen by the naked eye, and this compensation can be updated based on a position and/or orientation of the user and/or the user's view. In some embodiments, where display component 130 is implemented as an autostereoscopic display, system 100A may store presets corresponding to multiple positions and/or postures of a user (e.g., sitting in seat with head against rest, standing at the wheel, and/or other postures). In some embodiments, each image capture components 130 and/or optical elements 135 may be implemented with matched fixed focal lengths and/or slaved zoom lens arrangements (e.g., where the zoom level of one is slaved to the other).

Optional embodiments for monitoring module 131 include a pan/tilt arrangement with stereo wide field image capture component pair for search and zoom for tracking; the pan/tilt arrangement integrated with a solid-state radar (e.g., 360 degrees for search or forward looking), GPS, and/or heading sensors (e.g., other modules 146 and/or sensing components 160), where stereoscopic image data is overlaid with other sensor data and mounting system 1210 is configured to provide radar cueing to slew of monitoring module 131; the pan/tilt arrangement integrated with other modules and/or sensors, where mounting system 1210 is configured to stabilize monitoring module 131 against motion of mobile structure 101 in pitch, roll, and/or yaw (e.g., under the control of processing component 110).

Figure 13:
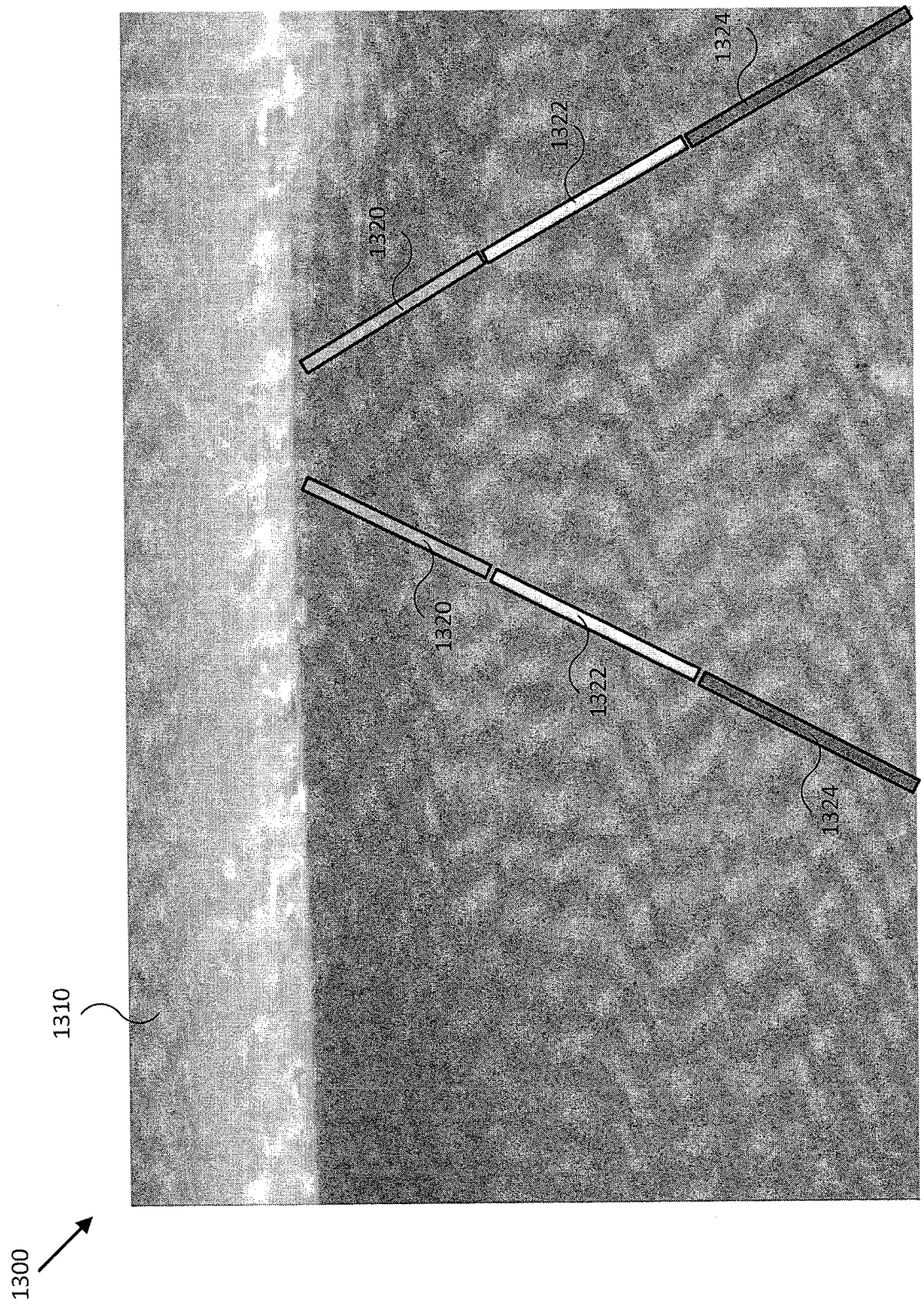
FIG. 13 illustrates a two dimensional representation of a stereoscopic thermal view provided by a monitoring system in accordance with an embodiment of the present disclosure.

FIG. 13 illustrates a two dimensional representation 1300 of a stereoscopic thermal view provided by a monitoring system in accordance with an embodiment of the present disclosure. As shown in FIG. 13, stereoscopic view 1310 may include beam lines 1320, 1322, 1324 configured to indicate the width of mobile structure 180 and the trajectory of the width of mobile structure 180 on a current heading to judge clearances in tight waterway navigation, and for collision avoidance, for example. As shown, a density and/or color of the beam lines 1320, 1322, 1324 may be varied to indicate clearance levels (e.g., red for tight clearance, yellow and green for looser clearances). In some embodiments, system 100A may be configured to provide beam lines on a single image overlaid as a single pair of lines to show trajectory of the ship with beam clearance (e.g., the beam of a ship being its maximum width along lateral axis 1203).

Figure 14:
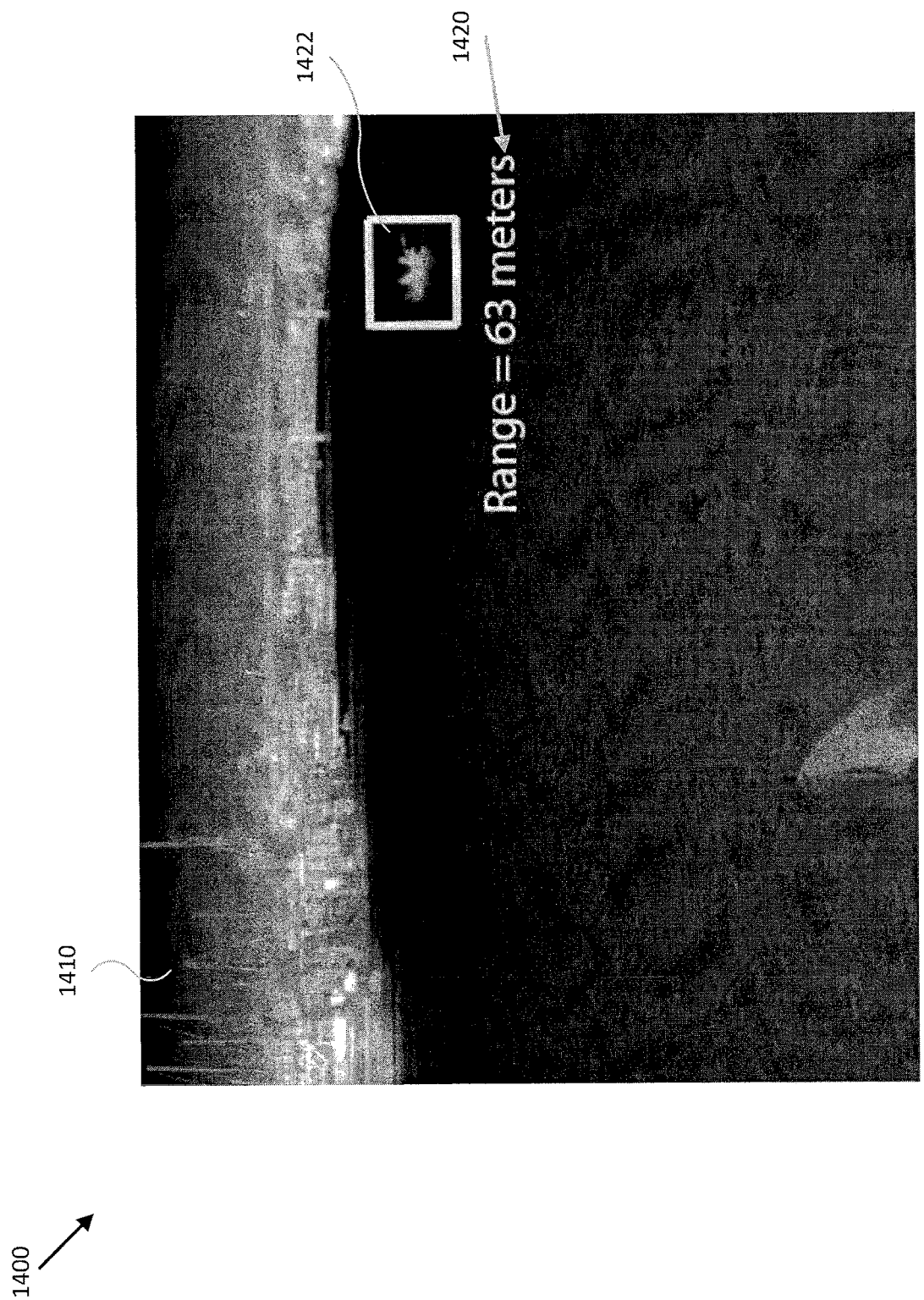
FIG. 14 illustrates a two dimensional representation of a stereoscopic thermal view provided by a monitoring system in accordance with an embodiment of the present disclosure.

FIG. 14 illustrates a two dimensional representation 1400 of a stereoscopic thermal view provided by a monitoring system in accordance with an embodiment of the present disclosure. As shown in FIG. 13, system 100A may be configured to provide TIDAR information within a stereoscopic thermal image 1410. For example, such TIDAR information may include box 1422 to indicate a ranged object and distance measurement indicator 1420 to provide the distance to the ranged object. In such embodiments, monitoring module 131 may include two forward-looking thermal image capture components 130 with a short or long baseline distance between them and highly overlapping fields of view. Video analytics may look for objects that are common in both images and determine their distance from monitoring module 131 via the parallax shift in the object's centroid between the two images. Ranged objects may then be indicated on nautical charts or on a thermal image and may be colorized according to distance and/or approach vector, such as putting colored analytics boxes around them, and text indicating range.

Figure 15:
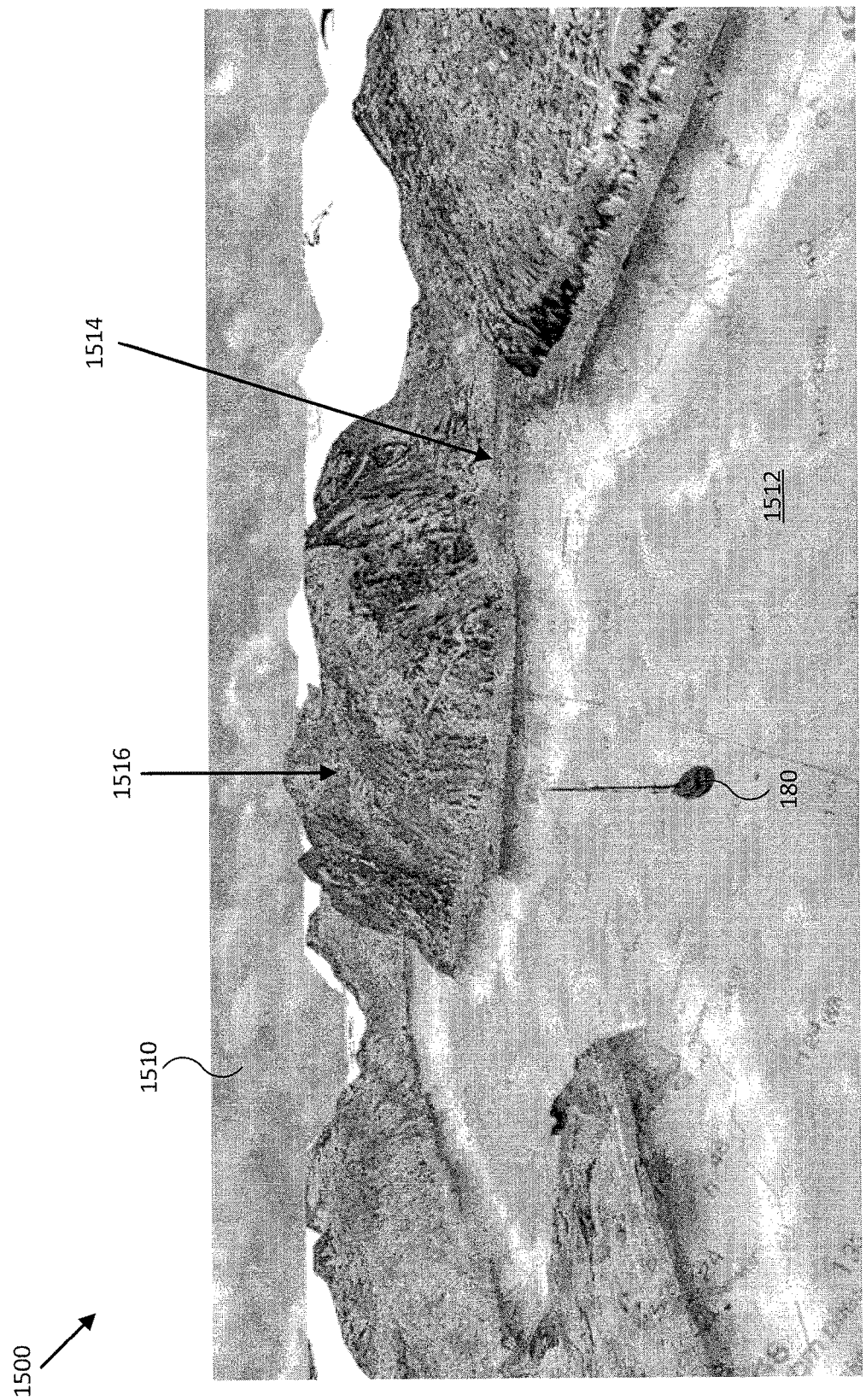
FIG. 15 illustrates a two dimensional representation of a stereoscopic view provided by a monitoring system in accordance with an embodiment of the present disclosure.

FIG. 15 illustrates a two dimensional representation 1500 of a stereoscopic view provided by a monitoring system in accordance with an embodiment of the present disclosure. As shown in FIG. 15, system 100A may be configured to provide a variety of sensor and/or other information on a stereoscopic view 1510 of the environment around mobile structure 180. For example, stereoscopic view 1510 may include bathymetric imagery 1512 generated from a nautical chart and/or sonar data, shore line imagery 1514 generated from the nautical chart and/or radar data, and thermal and/or visible light imagery 1516 generated from one or more monitoring modules 131 including image capture components, as described herein. As shown, each set of imagery and/or information may be combined and presented to a user as a stereoscopic view 1510 of the environment about mobile structure 180. In some embodiments, the point of view or perspective of stereoscopic view may be from an elevated view and/or from the perspective of an operator of mobile structure 180. In various embodiment, display component 140 may be implemented as an autostereoscopic multifunction display (MFD) (e.g., with parallax barrier film technology) to show an operator three dimensional navigational data including 3D nautical charts as shown in FIG. 15, 3D sonar data from fish finders and bathymetry, AIS data, ship's radar data and TIDAR data, all overlaid on the 3D nautical chart backdrop.

Figure 16:
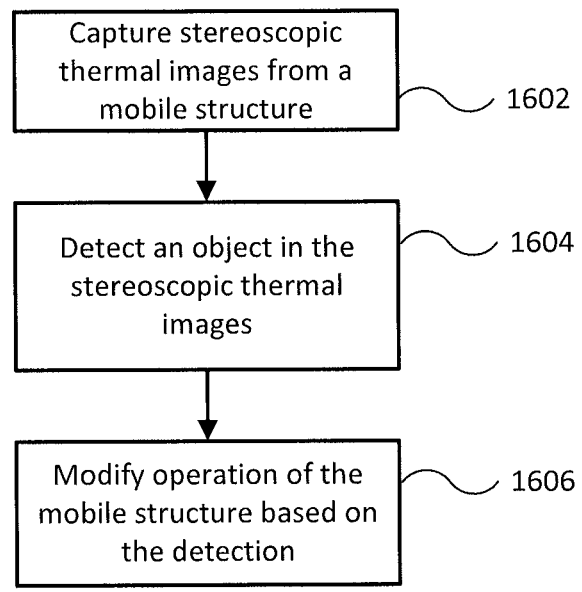
FIG. 16 shows a flow chart illustrating a method for monitoring a volume around a mobile structure in accordance with various embodiments of the present disclosure.

FIG. 16 shows a flow chart illustrating a method for monitoring a volume around a mobile structure in accordance with various embodiments of the present disclosure. In block 1602, system 100A captures stereoscopic thermal images taken by monitoring module 130 from mobile structure 180. In block 1604, system 100A detects an object in the stereoscopic thermal images. In block 1606, system 100A modifies operation of the mobile structure based on the detection.

Where applicable, various embodiments of the invention may be implemented using hardware, software, or various combinations of hardware and software. Where applicable, various hardware components and/or software components set forth herein may be combined into composite components comprising software, hardware, and/or both without departing from the scope and functionality of the present disclosure. Where applicable, various hardware components and/or software components set forth herein may be separated into subcomponents having software, hardware, and/or both without departing from the scope and functionality of the present disclosure. Where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, ordering of various steps described herein may be changed, combined into composite steps, and/or separated into sub-steps to provide features described herein.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

We claim:

1. A system comprising:
a stereoscopic monitoring module coupled to a watercraft and configured to provide stereoscopic infrared images of an environment and/or volume around at least a portion of the watercraft;
a display configured to receive the stereoscopic infrared images provided by the stereoscopic monitoring module and display stereoscopic imagery corresponding to the stereoscopic infrared images to a user of the watercraft, wherein the stereoscopic infrared images comprise thermal imagery and wherein the stereoscopic imagery comprises beam lines indicating a width of the watercraft and a trajectory of the watercraft on a current heading, the display configured to render the beam lines as having a varying line type along the trajectory to indicate clearance levels at different points along the trajectory;
a processing component configured to receive and process the stereoscopic infrared images provided by the stereoscopic monitoring module and detect a person in the environment and/or volume based on the stereoscopic infrared images and a difference in temperature between the person and the environment and/or volume; and
a control component comprising a logic device configured to generate control signals to modify operation of the watercraft based, at least in part, on the stereoscopic infrared images and the detection of the person in the environment and/or volume, wherein the control signals are configured to activate or deactivate, or increase or decrease power of, a propulsion mechanism for the watercraft, and operate a steering mechanism for the watercraft, to maneuver the watercraft and to avoid the detected person.

2. The system of claim 1, wherein:
the varying line type comprises a varying color;
the stereoscopic monitoring module comprises a pair of visible light imaging modules and is configured to provide stereoscopic visible light images that overlap with the stereoscopic infrared images;
the display is configured to receive the stereoscopic visible light images; and
the stereoscopic imagery displayed to the user of the watercraft comprises the stereoscopic infrared images blended with the stereoscopic visible light images to form high contrast thermal stereoscopic imagery or true color thermal stereoscopic imagery.

3. The system of claim 1, wherein:
the display comprises a stereoscopic display comprising stereoscopic goggles;

the stereoscopic goggles are implemented with a head tracking sensor; and the stereoscopic monitoring module comprises a mounting system configured to pan and/or tilt the stereoscopic monitoring module to substantially match a viewing orientation of the stereoscopic goggles as measured by the head tracking sensor.

4. The system of claim 1, wherein:

the varying line type comprises a varying line density;

the display comprises a stereoscopic display comprising an autostereoscopic display configured to present a stereoscopic view to the user of the watercraft.

5. The system of claim 1, further comprising:

an illumination component comprising one or more visible, infrared, and/or ultraviolet transmitters for illuminating at least the environment and/or volume around the at least portion of the watercraft.

6. The system of claim 1, further comprising:

one or more additional sensors comprising a radar sensor, a sonar sensor, a lidar sensor, a global positioning satellite sensor, an orientation sensor, and/or a heading sensor coupled to the stereoscopic monitoring module, wherein:

the stereoscopic monitoring module is configured to provide sensor data generated by the one or more additional sensors corresponding to the stereoscopic infrared images; and the display is configured to receive the sensor data from the stereoscopic monitoring module and overlay the stereoscopic imagery displayed to the user of the watercraft with the sensor data.

7. The system of claim 1, further comprising:

the processing component configured to process the stereoscopic infrared images provided by the stereoscopic monitoring modules and generate one or more stereoscopic depth cues for inclusion in the stereoscopic imagery displayed to the user of the watercraft, wherein the one or more stereoscopic depth cues comprise thermal infrared detection and ranging data configured to indicate extents of and/or distances to objects in the stereoscopic infrared images, and/or stereo nautical charts onto which the stereoscopic infrared images may be overlaid to provide a contextual view of the environment and/or volume around the at least portion of the watercraft.

8. The system of claim 1, further comprising:

an articulated mounting system for the stereoscopic monitoring module, wherein the articulated mounting system is configured to pan and/or tilt the stereoscopic monitoring module based, at least in part, on the control signals generated by the control component.

9. A method of operating the system of claim 1, the method comprising:

capturing the stereoscopic infrared images by a pair of infrared imaging modules of the stereoscopic monitoring module and providing the stereoscopic infrared images to the processing component;

processing the stereoscopic infrared images to generate stereoscopic depth cues for inclusion in the stereoscopic imagery displayed to the user of the watercraft;

generating, by the control component, the control signals to modify operation of the watercraft based, at least in part, on the generated stereoscopic depth cues.

10. The method of claim 9, further comprising:

modifying operation of the watercraft by providing the control signals generated by the control component to steering and/or propulsion system of the watercraft.

11. The method of claim 9, further comprising:

receiving the stereoscopic infrared images from the stereoscopic monitoring module; and displaying the stereoscopic imagery to the user of the watercraft, wherein the stereoscopic imagery comprises the generated stereoscopic depth cues.

12. The method of claim 9, wherein the stereoscopic infrared images comprise stereoscopic thermal images of the environment and/or volume around the at least portion of the watercraft, the method further comprising:

capturing stereoscopic visible light images, by a pair of visible light imaging modules of the stereoscopic monitoring module, that overlap with the stereoscopic thermal images and providing the stereoscopic visible light images to the processing component;

processing the overlapping stereoscopic thermal images and stereoscopic visible light images to generate high contrast thermal images and/or true color thermal images for inclusion in the stereoscopic imagery displayed to the user of the watercraft; and displaying the stereoscopic imagery to the user of the watercraft.

13. The system of claim 1, wherein:

detection of the person comprises detecting the person is a man overboard, the environment and/or volume comprises a volume of water around the watercraft, and the difference in temperature between the person and the environment and/or volume comprises a difference between a body temperature of the person and the volume of water that is less than 70 degrees Fahrenheit.

14. The system of claim 1, wherein:

the processing component is configured to detect debris based, at least in part, on the stereoscopic infrared images, that may damage a propeller of the watercraft, and the control signals to modify operation of the watercraft are configured to maneuver the watercraft to avoid the detected debris.

15. A method comprising:

capturing stereoscopic infrared images of an environment and/or volume around at least a portion of a watercraft by a stereoscopic monitoring module coupled to the watercraft;

displaying stereoscopic imagery corresponding to the stereoscopic infrared images comprising beam lines indicating a width of the watercraft and a trajectory of the watercraft on a current heading to a user of the watercraft, the beam lines having a varying line type along the trajectory to indicate clearance levels at different points along the trajectory, wherein the stereoscopic infrared images comprise thermal imagery;

receiving, by a processing component, the stereoscopic infrared images provided by the stereoscopic monitoring module;

detecting, by the processing component, a person in the environment and/or volume based on the stereoscopic infrared images and a difference in temperature between the person and the environment and/or volume; and generating, by a control component, control signals to modify operation of the watercraft based, at least in part, on the stereoscopic infrared images and detecting the person is in the environment and/or volume, wherein the control signals are configured to activate or deactivate, or increase or decrease power of, a propulsion mechanism for the watercraft, and operate a steering mechanism for the watercraft, to maneuver the watercraft and to avoid the detected person.

16. The method of claim 15, further comprising:

processing the stereoscopic infrared images to generate stereoscopic depth cues corresponding to the stereoscopic infrared images, wherein the stereoscopic imagery displayed to the user of the watercraft corresponds to the stereoscopic infrared images and the stereoscopic depth cues; and generating, by the control component, the control signals to modify operation of the watercraft based, at least in part, on the stereoscopic infrared images and the stereoscopic depth cues.

17. The method of claim 15, wherein the varying line type comprises a varying color, and the stereoscopic infrared images comprise stereoscopic thermal images of the environment and/or volume around the at least portion of the watercraft, the method further comprising:

capturing stereoscopic visible light images, by a pair of visible light imaging modules of the stereoscopic monitoring module, that overlap with the stereoscopic thermal images and providing the stereoscopic visible light images to the processing component; and processing the overlapping stereoscopic thermal images and stereoscopic visible light images to generate high contrast thermal images and/or true color thermal images for inclusion in the stereoscopic imagery displayed to the user of the watercraft.

18. The method of claim 15, wherein the displaying the stereoscopic imagery comprises:

displaying, using a stereoscopic display comprising stereoscopic goggles, the stereoscopic imagery to the user of the watercraft, wherein the stereoscopic goggles are implemented with a head tracking sensor, and wherein the stereoscopic monitoring module comprises a mounting system configured to pan and/or tilt the stereoscopic monitoring module to substantially match a viewing orientation of the stereoscopic goggles as measured by the head tracking sensor.

19. The method of claim 15, wherein the varying line type comprises a varying line density, and the displaying the stereoscopic imagery comprises:

displaying, using a stereoscopic display comprising an autostereoscopic display, the stereoscopic imagery to the user of the watercraft.

20. The method of claim 15, further comprising:

illuminating at least the environment and/or volume around the at least portion of the watercraft via an illumination component comprising one or more visible, infrared, and/or ultraviolet transmitters.

21. The method of claim 15, further comprising:

providing sensor data generated by one or more additional sensors coupled to the stereoscopic monitoring module, wherein the one or more additional sensors comprise one or more of a radar sensor, a sonar sensor, a lidar sensor, a global positioning satellite sensor, an orientation sensor, and/or a heading sensor; and overlaying the stereoscopic imagery displayed to the user of the watercraft with the sensor data generated by the one or more additional sensors coupled to the stereoscopic monitoring module.

* * * * *